US009723229B2

(12) United States Patent
Nguyen et al.

(10) Patent No.: US 9,723,229 B2
(45) Date of Patent: Aug. 1, 2017

(54) THERMAL DETECTION SYSTEMS, METHODS, AND DEVICES

(75) Inventors: Evans H. Nguyen, Renton, WA (US); Matthew J. Mergener, Germantown, WI (US); Wade Burch, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 304 days.

(21) Appl. No.: 13/819,496

(22) PCT Filed: Aug. 29, 2011

(86) PCT No.: PCT/US2011/049541
§ 371 (c)(1),
(2), (4) Date: Apr. 4, 2013

(87) PCT Pub. No.: WO2012/027739
PCT Pub. Date: Mar. 1, 2012

(65) Prior Publication Data
US 2013/0188058 A1    Jul. 25, 2013

Related U.S. Application Data

(60) Provisional application No. 61/377,656, filed on Aug. 27, 2010, provisional application No. 61/484,259, filed on May 10, 2011.

(51) Int. Cl.
*G01J 5/02* (2006.01)
*G01J 5/04* (2006.01)
(Continued)

(52) U.S. Cl.
CPC .............. *H04N 5/332* (2013.01); *G01J 5/02* (2013.01); *G01J 5/025* (2013.01); *G01J 5/028* (2013.01);
(Continued)

(58) Field of Classification Search
CPC .. G01J 5/02; G01J 5/025; G01J 5/0265; G01J 5/028; G01J 5/04; H04N 5/2252;
(Continued)

(56) References Cited
U.S. PATENT DOCUMENTS 3,017,513 A    1/1962    Messelt
3,147,682 A    9/1964    Lind, Jr. et al.
(Continued)

FOREIGN PATENT DOCUMENTS

CN    101111748    1/2008
EP    1956833    8/2008
(Continued)

OTHER PUBLICATIONS

Agema Infrared Systems, Thermovision 782 Series Digital Image Processing System (DIPS), product specification brochure, 6 pages, Pub. No. 556, Sweden (1985).
(Continued)

*Primary Examiner* — Mohammed Rahaman
*Assistant Examiner* — James Boylan
(74) *Attorney, Agent, or Firm* — Michael Best & Friedrich LLP

(57) ABSTRACT

Systems, methods, and devices for thermal detection. A thermal detection device includes a visual camera, a thermal detector, a controller, a user interface, a display, and a removable and rechargeable battery pack. The thermal detection device also includes a plurality of additional software and hardware modules configured to perform or execute various functions and operations of the thermal detection device. An output from the visual camera and an output from the thermal detector are combined by the controller or the plurality of additional modules to generate a combined image for display on the display.

15 Claims, 15 Drawing Sheets

(51) Int. Cl.
  *H04N 5/33*     (2006.01)
  *H04N 5/225*    (2006.01)
  *H04N 5/232*    (2006.01)
  *H04N 5/365*    (2011.01)

(52) U.S. Cl.
  CPC .............. *G01J 5/0265* (2013.01); *G01J 5/04*
    (2013.01); *H04N 5/2252* (2013.01); *H04N*
    *5/2256* (2013.01); *H04N 5/23229* (2013.01);
    *H04N 5/23293* (2013.01); *H04N 5/3651*
    (2013.01); *H04N 5/2258* (2013.01)

(58) Field of Classification Search
  CPC .............. H04N 5/2256; H04N 5/2258; H04N
    5/23229; H04N 5/23293; H04N 5/332;
    H04N 5/3651
  USPC .................................................. 348/164, 165
  See application file for complete search history.

(56) References Cited

U.S. PATENT DOCUMENTS

| | | |
|---|---|---|
| 3,597,617 A * | 8/1971 | Passaro .................... H04N 5/33 250/334 |
| 3,646,267 A | 2/1972 | Tompsett |
| 4,238,728 A | 12/1980 | Wells, Jr. et al. |
| 4,343,182 A | 8/1982 | Pompei |
| 4,494,042 A | 1/1985 | Roche |
| 4,529,912 A | 7/1985 | Northrup et al. |
| 4,590,429 A | 5/1986 | Sell |
| 4,617,519 A | 10/1986 | Rosenthal |
| 4,687,344 A | 8/1987 | Lillquist |
| 4,779,687 A | 10/1988 | Schreiber et al. |
| 4,779,739 A | 10/1988 | Carl et al. |
| 4,842,147 A | 6/1989 | Carl et al. |
| 4,922,185 A | 5/1990 | Davidson et al. |
| 4,943,752 A | 7/1990 | Todd et al. |
| 4,999,614 A | 3/1991 | Ueda et al. |
| 5,005,083 A | 4/1991 | Grage et al. |
| 5,008,626 A | 4/1991 | Boyd, Sr. |
| 5,045,937 A | 9/1991 | Myrick |
| 5,140,416 A | 8/1992 | Tinkler |
| 5,179,339 A | 1/1993 | Volk, Jr. |
| 5,319,312 A | 6/1994 | Segillia |
| 5,369,363 A | 11/1994 | Hey |
| 5,434,510 A | 7/1995 | Halstead |
| 5,453,683 A | 9/1995 | Pagano |
| 5,512,748 A | 4/1996 | Hanson |
| 5,528,147 A | 6/1996 | Konopka |
| 5,534,695 A | 7/1996 | Miyoshi et al. |
| 5,539,317 A | 7/1996 | Janning |
| 5,637,871 A * | 6/1997 | Piety .......................... G01J 5/02 250/330 |
| 5,666,029 A | 9/1997 | McDonald |
| 5,677,532 A | 10/1997 | Duncan et al. |
| 5,732,302 A | 3/1998 | Yokota |
| 5,763,885 A | 6/1998 | Murphy |
| 5,789,622 A | 8/1998 | Quon |
| 5,936,245 A | 8/1999 | Giollot et al. |
| 5,952,832 A | 9/1999 | Stevanovic et al. |
| 5,994,701 A | 11/1999 | Tsuchimoto et al. |
| 6,009,340 A | 12/1999 | Hsia |
| 6,028,312 A | 2/2000 | Wadsworth et al. |
| 6,033,130 A | 3/2000 | Muroi et al. |
| 6,115,559 A | 9/2000 | Balling et al. |
| 6,133,569 A | 10/2000 | Shoda |
| 6,232,602 B1 | 5/2001 | Kerr |
| 6,249,002 B1 | 6/2001 | Butler |
| 6,255,650 B1 | 7/2001 | Warner et al. |
| 6,292,311 B1 | 9/2001 | Bohn et al. |
| 6,335,478 B1 | 1/2002 | Chou et al. |
| 6,373,055 B1 | 4/2002 | Kerr |
| 6,480,001 B2 | 11/2002 | Frederick |
| 6,486,473 B2 | 11/2002 | Salapow et al. |
| 6,534,988 B2 | 3/2003 | Flory, IV |
| D472,911 S | 4/2003 | Bielefeld |
| 6,559,447 B2 | 5/2003 | Wood |
| 6,603,302 B2 | 8/2003 | Prineppi |
| 6,606,115 B1 | 8/2003 | Alicandro et al. |
| 6,630,674 B2 | 10/2003 | Knauth et al. |
| 6,649,912 B2 | 11/2003 | Salapow et al. |
| 6,682,381 B1 | 1/2004 | Michael |
| 6,707,044 B2 | 3/2004 | Lannestedt et al. |
| 6,722,184 B2 | 4/2004 | Bennette et al. |
| 6,730,909 B2 | 5/2004 | Butler |
| 6,734,678 B2 | 5/2004 | Frederick |
| 6,777,942 B2 | 8/2004 | Schadhauser |
| 6,784,667 B2 | 8/2004 | Belenger et al. |
| 6,787,775 B1 | 9/2004 | Bielefeld et al. |
| 6,795,209 B1 | 9/2004 | Patton et al. |
| 6,806,469 B2 | 10/2004 | Kerr |
| 6,849,849 B1 | 2/2005 | Warner et al. |
| 6,956,603 B2 | 10/2005 | Fujii |
| 6,967,445 B1 | 11/2005 | Jewell et al. |
| 7,030,378 B2 | 4/2006 | Allen |
| 7,034,543 B2 | 4/2006 | Iwasawa |
| 7,049,822 B2 | 5/2006 | Kung |
| 7,064,554 B2 | 6/2006 | Moore |
| 7,093,974 B2 | 8/2006 | Kienitz |
| 7,102,130 B2 | 9/2006 | Kerr |
| 7,105,796 B2 | 9/2006 | Lewis et al. |
| 7,105,818 B2 * | 9/2006 | Anderson et al. ......... 250/338.1 |
| 7,145,342 B2 | 12/2006 | Wendt et al. |
| 7,157,705 B2 | 1/2007 | Hamrelius et al. |
| 7,182,529 B2 | 2/2007 | Kurosawa |
| 7,183,549 B2 | 2/2007 | Teich et al. |
| 7,208,733 B2 | 4/2007 | Mian et al. |
| 7,231,307 B2 | 6/2007 | Takei |
| 7,250,603 B1 | 7/2007 | Nugent |
| 7,250,769 B1 | 7/2007 | Olson |
| 7,304,297 B1 | 12/2007 | King |
| 7,312,822 B2 | 12/2007 | Lannestedt et al. |
| 7,321,119 B2 | 1/2008 | King |
| 7,336,823 B2 | 2/2008 | Guldevall |
| 7,365,771 B2 * | 4/2008 | Kahn ...................... G01S 17/42 348/164 |
| 7,369,174 B2 | 5/2008 | Olita et al. |
| 7,381,952 B2 | 6/2008 | Teich et al. |
| 7,411,193 B2 | 8/2008 | Warner et al. |
| 7,422,365 B2 | 9/2008 | Chamberlain |
| 7,423,272 B2 | 9/2008 | Hasegawa et al. |
| 7,445,377 B2 | 11/2008 | Lee et al. |
| 7,457,441 B2 | 11/2008 | Hartlove |
| 7,483,208 B2 | 1/2009 | Zadravec |
| 7,508,605 B2 | 3/2009 | Nishikawa et al. |
| 7,519,210 B2 | 4/2009 | Hirsch et al. |
| 7,528,372 B2 | 5/2009 | Garvey, III et al. |
| 7,535,002 B2 | 5/2009 | Johnson et al. |
| 7,538,326 B2 | 5/2009 | Johnson et al. |
| 7,541,581 B2 | 6/2009 | Reed et al. |
| 7,596,281 B2 | 9/2009 | Irani et al. |
| 7,611,277 B2 | 11/2009 | Hebrank et al. |
| 7,642,515 B2 | 1/2010 | Tinnes |
| 7,649,174 B2 | 1/2010 | Mammen et al. |
| 7,652,251 B1 | 1/2010 | King |
| 7,655,908 B2 | 2/2010 | Kerr |
| 7,693,679 B1 | 4/2010 | Warnke et al. |
| 7,767,963 B1 | 8/2010 | Fujii |
| 7,867,019 B1 | 1/2011 | Loukusa et al. |
| 7,880,777 B2 | 2/2011 | Anderson |
| 7,938,004 B1 | 5/2011 | Brunsch, Jr. et al. |
| 7,959,353 B2 | 6/2011 | Anantharaman |
| 7,959,458 B2 | 6/2011 | Loukusa et al. |
| 8,235,590 B2 | 8/2012 | Sheard et al. |
| 2002/0074499 A1 | 6/2002 | Butler |
| 2002/0109508 A1 | 8/2002 | Huang |
| 2002/0162963 A1 | 11/2002 | Lannestedt et al. |
| 2003/0025492 A1 | 2/2003 | Prineppi |
| 2003/0057371 A1 * | 3/2003 | Wood ....................... G01J 1/02 250/330 |
| 2003/0146383 A1 | 8/2003 | Knauth |
| 2004/0115519 A1 | 6/2004 | Lee |
| 2004/0239778 A1 | 12/2004 | Soga |
| 2005/0077469 A1 | 4/2005 | Kaushal |

(56) References Cited

U.S. PATENT DOCUMENTS

| | | | |
|---|---|---|---|
| 2005/0168573 | A1 | 8/2005 | Dennis et al. |
| 2006/0086815 | A1 | 4/2006 | Kang |
| 2006/0175549 | A1 | 8/2006 | Miller et al. |
| 2006/0249679 | A1* | 11/2006 | Johnson ............... G01C 3/08 250/332 |
| 2006/0261271 | A1 | 11/2006 | Lee |
| 2007/0074035 | A1 | 3/2007 | Scanlon et al. |
| 2007/0096024 | A1 | 5/2007 | Furuya et al. |
| 2007/0217036 | A1 | 9/2007 | Miyauchi et al. |
| 2007/0247517 | A1 | 10/2007 | Zhang et al. |
| 2007/0288993 | A1 | 12/2007 | Sakai et al. |
| 2008/0061791 | A1 | 3/2008 | Joos et al. |
| 2008/0231803 | A1* | 9/2008 | Feldon et al. ............ 351/206 |
| 2008/0265162 | A1 | 10/2008 | Hamrelius et al. |
| 2008/0278833 | A1 | 11/2008 | Yuan |
| 2008/0315885 | A1 | 12/2008 | Andresen et al. |
| 2009/0001269 | A1 | 1/2009 | Tadano |
| 2009/0029842 | A1 | 1/2009 | Khrapko et al. |
| 2009/0050806 | A1 | 2/2009 | Schmidt et al. |
| 2009/0090864 | A1 | 4/2009 | Glatzmaier et al. |
| 2009/0102925 | A1* | 4/2009 | Sheard ............... H04N 5/2252 348/164 |
| 2009/0121135 | A1 | 5/2009 | Warner et al. |
| 2009/0136093 | A1 | 5/2009 | Hartlove |
| 2009/0206077 | A1 | 8/2009 | Melmon et al. |
| 2009/0229842 | A1* | 9/2009 | Gray ............... H01M 2/1055 173/20 |
| 2009/0294666 | A1 | 12/2009 | Hargel |
| 2009/0302219 | A1 | 12/2009 | Johnson et al. |
| 2009/0324213 | A1 | 12/2009 | Wang |
| 2010/0001187 | A1 | 1/2010 | Fenske et al. |
| 2010/0046577 | A1 | 2/2010 | Sheard et al. |
| 2010/0073493 | A1 | 3/2010 | Godfrey et al. |
| 2010/0127171 | A1 | 5/2010 | Johsson et al. |
| 2010/0148066 | A1 | 6/2010 | Stratmann et al. |
| 2010/0157450 | A1 | 6/2010 | Im et al. |
| 2010/0162206 | A1 | 6/2010 | Roth et al. |
| 2010/0201958 | A1 | 8/2010 | Hauf |
| 2010/0207024 | A1 | 8/2010 | Thiele et al. |
| 2010/0265431 | A1 | 10/2010 | Li |
| 2010/0309315 | A1 | 12/2010 | Hogasten et al. |
| 2011/0014812 | A1 | 1/2011 | Loukusa et al. |
| 2011/0169961 | A1* | 7/2011 | Wu ............................... 348/164 |
| 2012/0249799 | A1 | 10/2012 | Shibata |
| 2013/0188058 | A1 | 7/2013 | Nguyen et al. |

FOREIGN PATENT DOCUMENTS

| | | | |
|---|---|---|---|
| EP | 2278288 | | 1/2011 |
| JP | 58-050439 | | 3/1983 |
| JP | 02-064800 | | 3/1990 |
| JP | 09-178566 | | 7/1997 |
| JP | 2001-005437 | * | 1/2001 |
| KR | 2011-0044666 | | 4/2011 |
| WO | 0004493 | | 1/2000 |
| WO | WO 2006060746 | | 6/2006 |
| WO | 2012027739 | | 3/2012 |
| WO | 2012125819 | | 9/2012 |

OTHER PUBLICATIONS

Agema Infrared Systems, Thermovision 570 Series, operator's manual, 72 pages, Pub. No. 557 265, Ed. A, Sweden (Apr. 1997).
Agema Infrared Systems, Thermovision 550 Series, operator's manual, 74 pages, Pub. No. 557 084, Ed. B, Sweden (Sep. 1997).
Agema Infrared Systems, Thermovision 210 Series The First Team, operator's manual, 90 pages, Publication No. 1 557 627 Rev. A, Sweden (Oct. 23, 2002).
Agema Infrared Systems, Thermovision 400 Series, operator's manual, 56 pages, New Pub. No. 1 557 628, Rev. A, Sweden (Oct. 23, 2002).
Flir Systems—Thermacam, Model 99 Database, operator's manual, 38 pages, Sweden (1999).
Flir Systems—Thermacam, Model PM390 Hand-held IR Imaging Radiometers, operating instruction, pp. 1-125, Document No. 14882-000 Rev. B (1999).
Flir Systems—Thermacam, Model PM595 High Performance Handheld Infrared Camera, The complete Predictive Maintenance Solution, brochure, 8 pages, North Billerica, USA (1999).
Flir Systems—Thermacam, Model P65, user's manual, 246 pages, Publication No. 1557954 Rev. a55, USA (2006).
Flir Systems—Thermacam, Model 2000 Reporter, operator's manual, pp. 1-249, Pub. No. 1 557 436 Version A, Sweden (1996-2000).
Inframetrics Inc., Model 522L Medical Infrared Imaging Radiometer, operator's manual, 62 pages, Document No. 06909-000 Rev. A, Waltham, USA (1990).
Inframetrics Inc., Model 760 Infrared Imaging Radiometer, operator's manual, 122 pages, Document No. 07137-000 Rev. C , Waltham, USA (1992).
Inframetrics Inc., Model 525-Imaging Radiometers for Applied Thermography, brochure, 40 pages, Bedford, USA, Aug. 1982, as evidenced by the attached Office of Scientific & Technical Information Report (see p. 7, 32, and 40).
Inframetrics Inc., Model 600 Equipment Setup, operations manual, 89 pages, Publication No. T559095 Rev. A, available at least as early as 1988, as evidenced by the attached Software Abstract from the Energy Science and Technology Software Center (see p. 89).
Inframetrics Inc., Model 700 Infrared Imaging Radiometer Features and Specifications, manual, 26 pages, Publication No. T559095 Rev. A, available at least as early as Dec. 1990, as evidenced by the attached Decision memo from the Comptroller General of the United States (see p. 22-24).
Inframetrics Inc., Model 535 Infrared Medical Thermography System, brochure, 15 pages, Billerica, USA, available at least as early as Aug. 18, 1998, as evidenced by the attached FDA 510(k) Summary (see pp. 11-13).
Inframetrics Inc., Model 520A Infrared Imaging Radiometer, operator's manual, 147 pages, Publication No. T559094 Rev. A, USA, available at least as early as 1983, as evidenced by the attached report on Big Strides in Refractory Management (see p. 142).
Inframetrics—Thermacam, Model PM380 Infrared Imaging Radiometers, introduction and overview manual, 30 pages, USA (1996).
Inframetrics Inc.—Thermacam, Model PM380 Infrared Predictive Maintenance in the Palm of your Hand, brochure, 4 pages, North Billerica, USA (1997).
Inframetrics—Thermacam, Model X90 Infrared FPA Predictive Maintenance System, brochure, 2 pages, USA (1998).
Inframetrics—Thermacam Ultra, Model PM395 Hand-held Infrared Imaging Radiometers, operating instructions, 121 pages, Publication No. T559098 Rev. A, North Billerica, USA, available at least as early as Oct. 19, 1998, as evidenced by the attached "Hot Products" Article on Design News (see p. 120).
International Search Report and Written Opinion for Application No. PCT/US2012/029217 dated Oct. 12, 2012 (10 pages).
Siemers, E., "Fluke Sued by Rival Flir" <http://www.bizjournal.com/seattle/stories/2010/08/16/daily45.html> Oregon Business Journal, webpage available since Aug. 20, 2010.
Atlas Copco Elektrowerkzeuge GmbH, Professional Quality Tools Catalogue 96/97 (Feb. 1996) 5 pages.
Atlas Copco, Professional Battery System PBS 3000 (1995) 3 pages.
International Search Report and Written Opinion for Application No. PCT/US2011/049541 dated Apr. 18, 2012 (8 pages).
Chinese Patent Office Action for Application No. 201180052026.5 dated Oct. 9, 2015 with translation (16 pages).
United States Patent Office Action for U.S. Appl. No. 13/803,875 dated Oct. 6, 2015 (19 pgs).
Chinese Patent Office Action for Application No. 201180052026.5 dated Jul. 1, 2016 (4 pages).
United States Patent Office Action for U.S. Appl. No. 14/004,686 dated Jul. 6, 2016 (17 pages).
European Patent Office Action for Application No. 11820773.7 dated Mar. 10, 2016 (5 pages).

(56) References Cited

OTHER PUBLICATIONS

Chinese Patent Office Action for Application No. 201180052026.5 dated Mar. 29, 2016 (3 pages).

* cited by examiner

THERMAL DETECTION SYSTEMS, METHODS, AND DEVICES

RELATED APPLICATIONS

This application claims the benefit of previously-filed, U.S. Provisional Patent Application No. 61/377,656, filed Aug. 27, 2010, and previously-filed, U.S. Provisional Patent Application No. 61/484,259, filed May 1, 2011, the entire contents of both of which are hereby incorporated by reference.

BACKGROUND

This invention relates to thermal detection devices. Thermal detection devices, such as thermal imagers, are used by professionals in a variety of industries to assess temperatures of objects within a field-of-view ("FOV") of the thermal imager. The assessment of the scene includes, for example, generating a multi-color or multi-level contrast image of the scene, determining temperature measurements of the scene, and identifying various alarm conditions within the scene (e.g., highest temperature, lowest temperature, average temperature, etc.).

SUMMARY

Although thermal detection devices are known, many of the devices are prohibitively expensive due to, among other things, the detectors being used for thermal detection. For example, many thermal imagers use a high-resolution microbolometer as a detector. The use of high-resolution microbolometers in thermal imagers allows the thermal imagers to generate accurate thermal images of a scene, but also significantly increases the cost of the thermal imagers.

The invention provides thermal detection devices which are configured to generate relative or absolute temperature representations of a scene. In one embodiment, the invention provides a thermal detection device that includes a visual camera, a thermopile array, a controller, a user interface, a display, and a removable and rechargeable battery pack. The thermal detection device also includes a plurality of additional software or hardware modules configured to perform or execute various functions and operations of the thermal detection device. An output from the visual camera and an output from the thermopile array are combined by the controller or one of the plurality of additional modules to generate a combined image for display.

In one embodiment, the invention provides a thermal imaging device that includes a housing, a visual camera, an infrared sensor, a display, a removable and rechargeable battery pack, and a controller. The housing includes a handle portion, and the removable and rechargeable battery pack is configured to be inserted into the handle portion for providing power to the thermal imaging device. The visual camera is configured to generate a first signal related to a visual image, the infrared sensor is configured to generate a second signal related to a thermal image, and the display is configured to display the visual image based on the first signal and the thermal image based on the second signal. The controller is electrically connected to the visual camera, the infrared sensor, the display, and the battery pack and is configured to control the display of the visual image and the thermal image on the display.

In another embodiment, the invention provides a method of operating a thermal imaging device. The method includes inserting a removable and rechargeable battery pack into a handle portion of the thermal imaging device, receiving a signal from a trigger portion related to capturing an image of a scene, and monitoring an ambient temperature associated with the thermal imaging device. The method also includes storing a visual image of the scene associated with a visual camera in a memory of the thermal imaging device, storing a thermal image of the scene associated with an infrared sensor in the memory of the thermal imaging device, and selectively displaying one of the visual image and the thermal image on a display.

In another embodiment, the invention provides a thermal imaging device that includes a visual camera, an infrared sensor, a display, a rechargeable lithium-based battery pack, and a controller. The visual camera is configured to generate a first signal related to a visual image, the infrared sensor is configured to generate a second signal related to a thermal image, and the display is configured to display the visual image based on the first signal and the thermal image based on the second signal. The rechargeable lithium-based battery pack is configured to be inserted into a handle portion of the thermal imaging device for providing power to the thermal imaging device. The controller is electrically connected to the visual camera, the infrared sensor, the display, and the battery pack and is configured to control the display of the visual image and the thermal image on the display. The controller includes a memory configured to store the visual image and the thermal image.

Other aspects of the invention will become apparent by consideration of the detailed description and accompanying drawings.

DETAILED DESCRIPTION

Figure 1A:
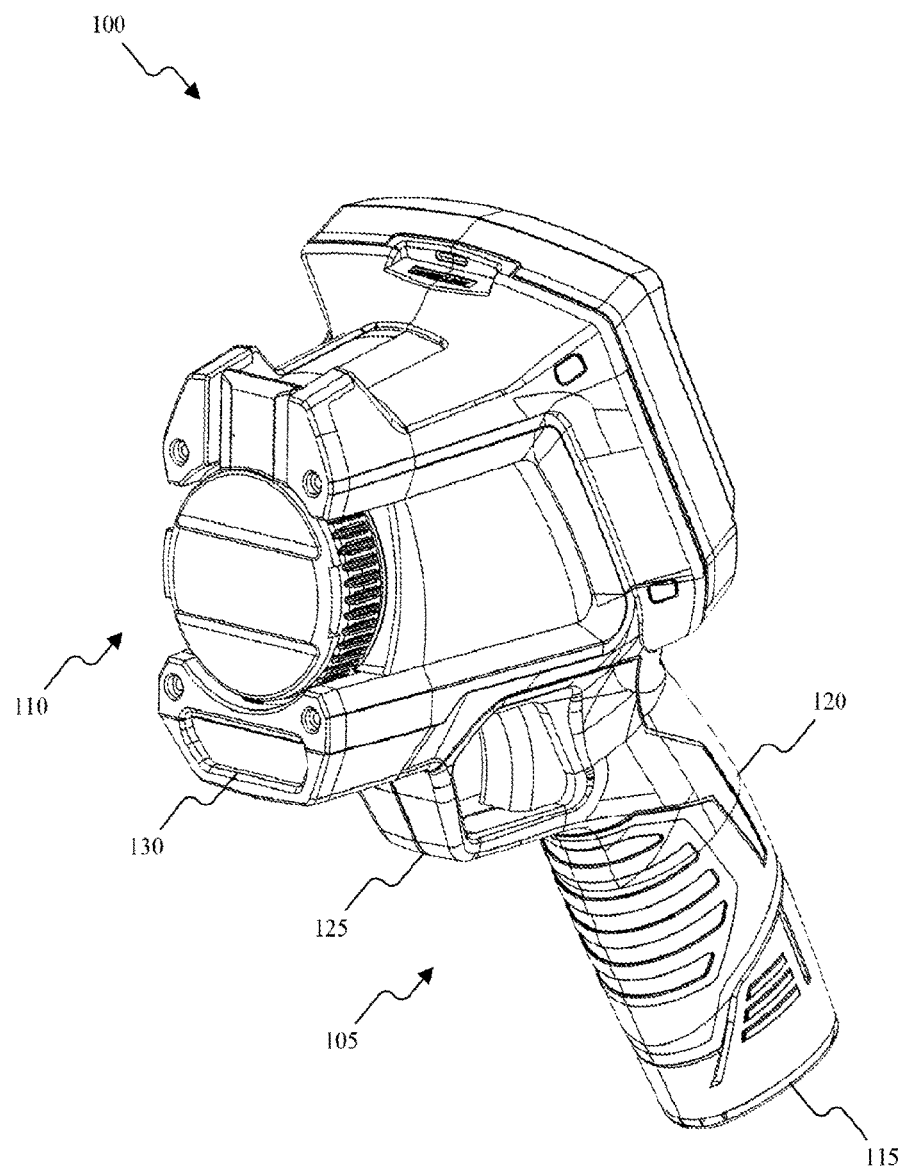
FIGS. 1A-1G illustrate a thermal detection device according to an embodiment of the invention.
Figure 1B:
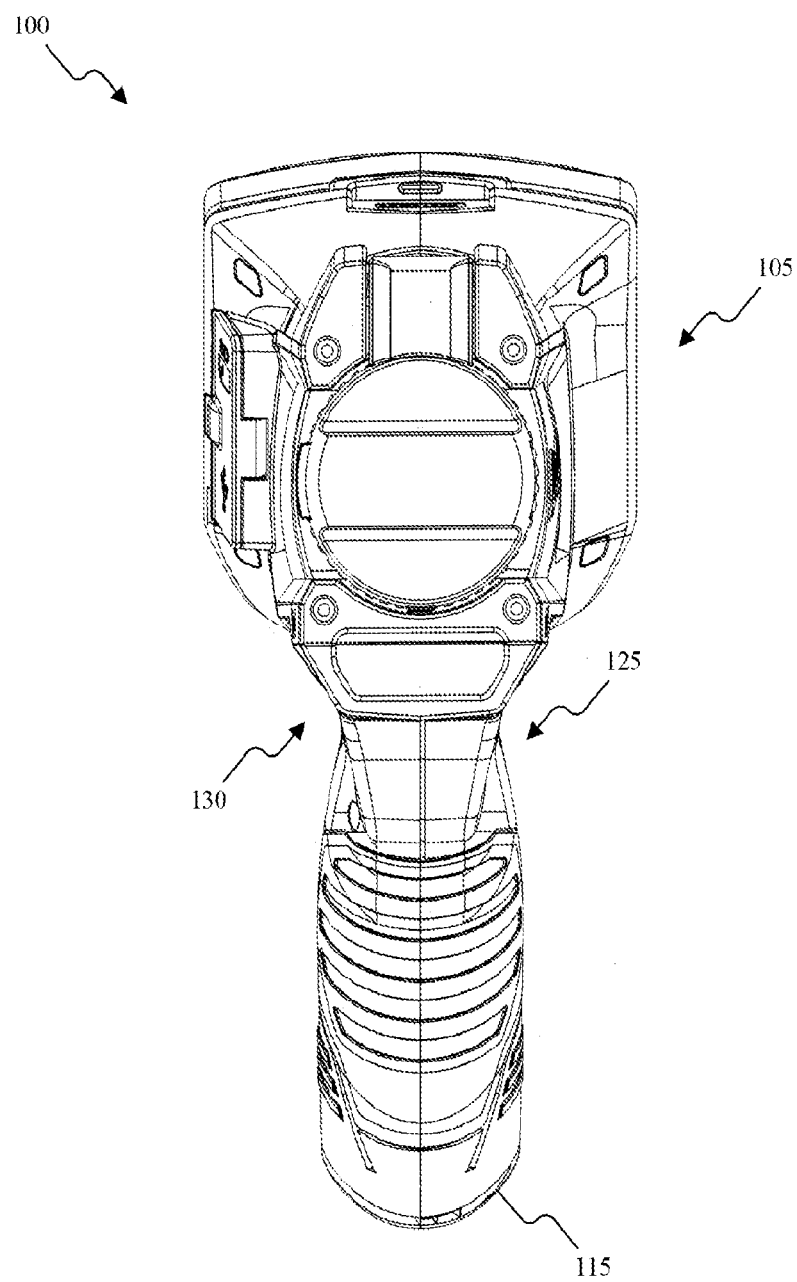
Figure 1C:
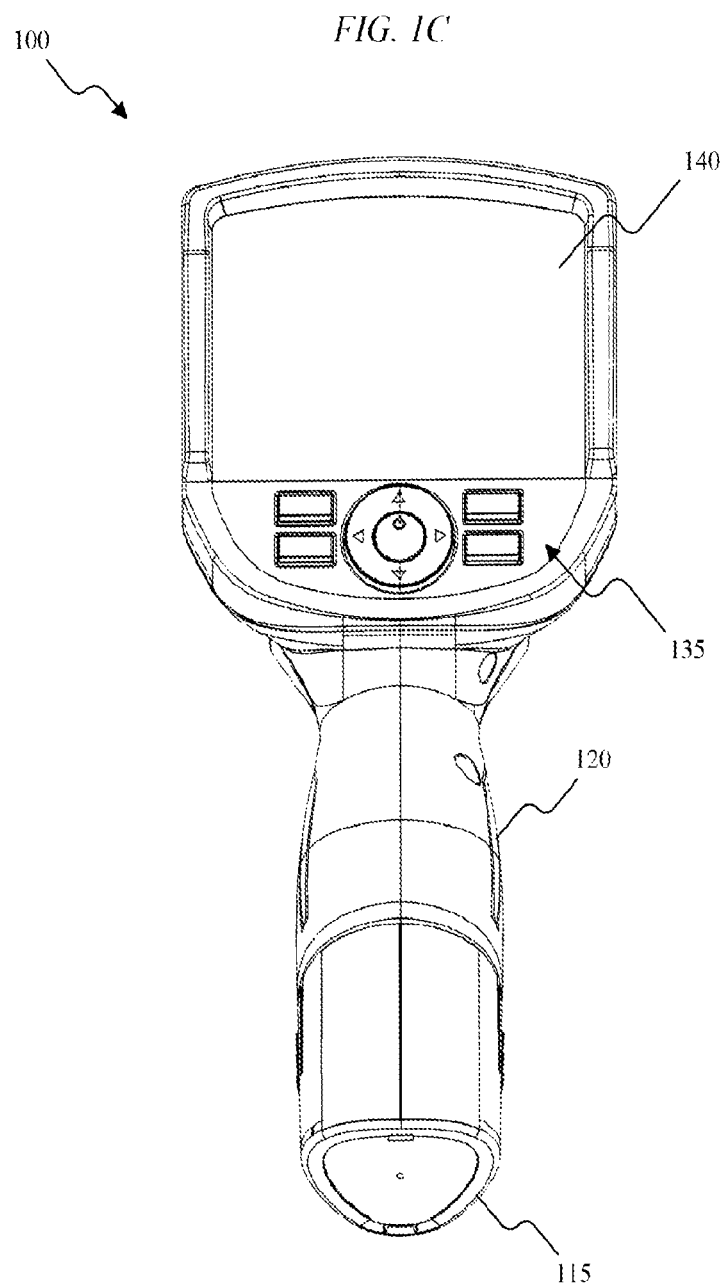
Figure 1D:
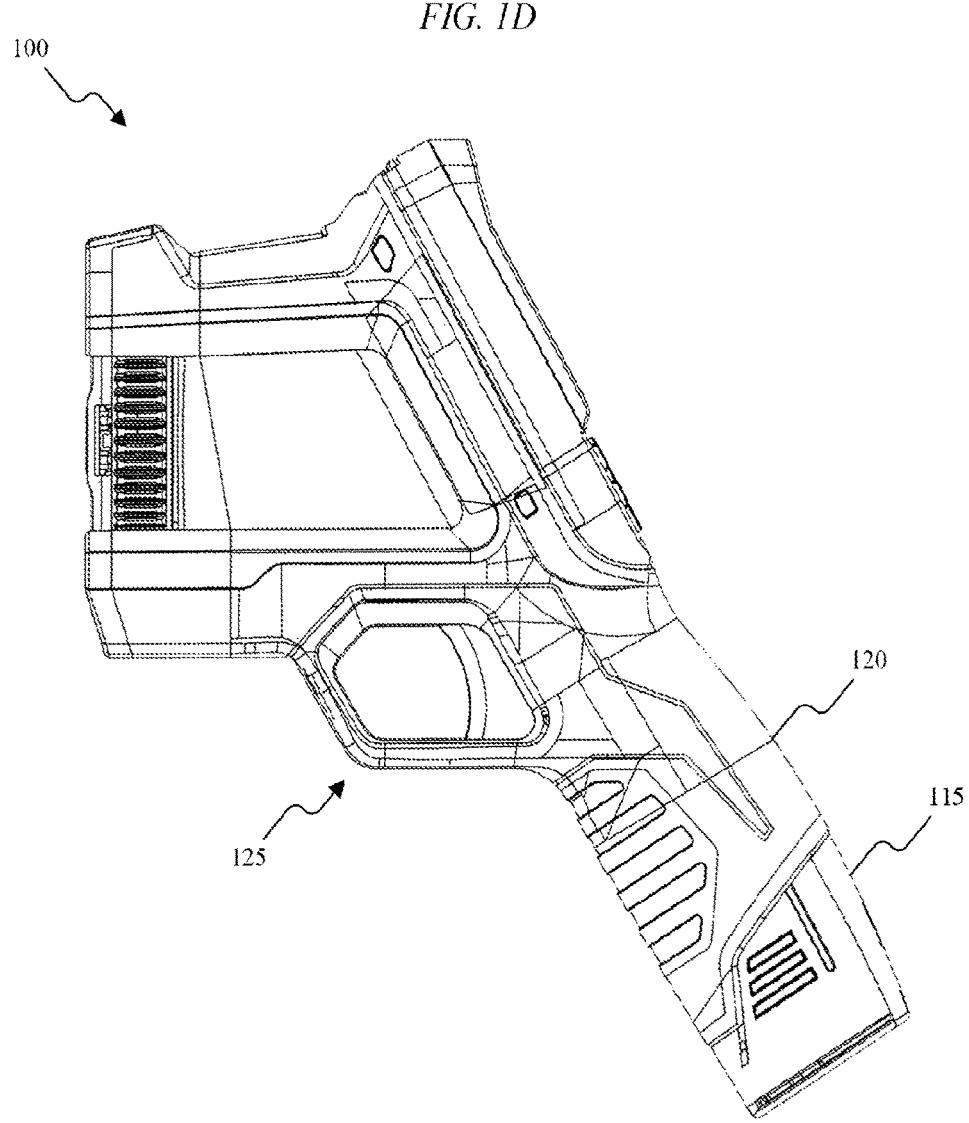
Figure 1E:
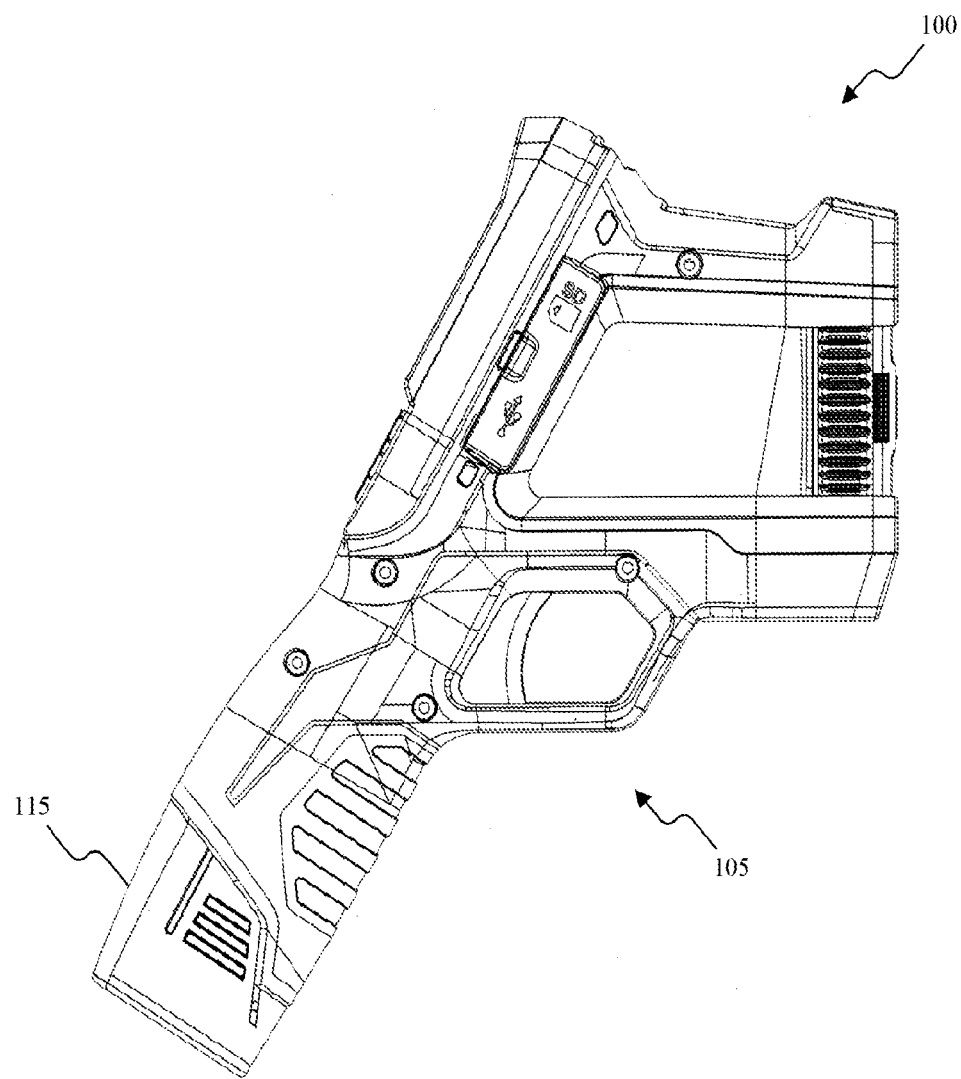
Figure 1F:
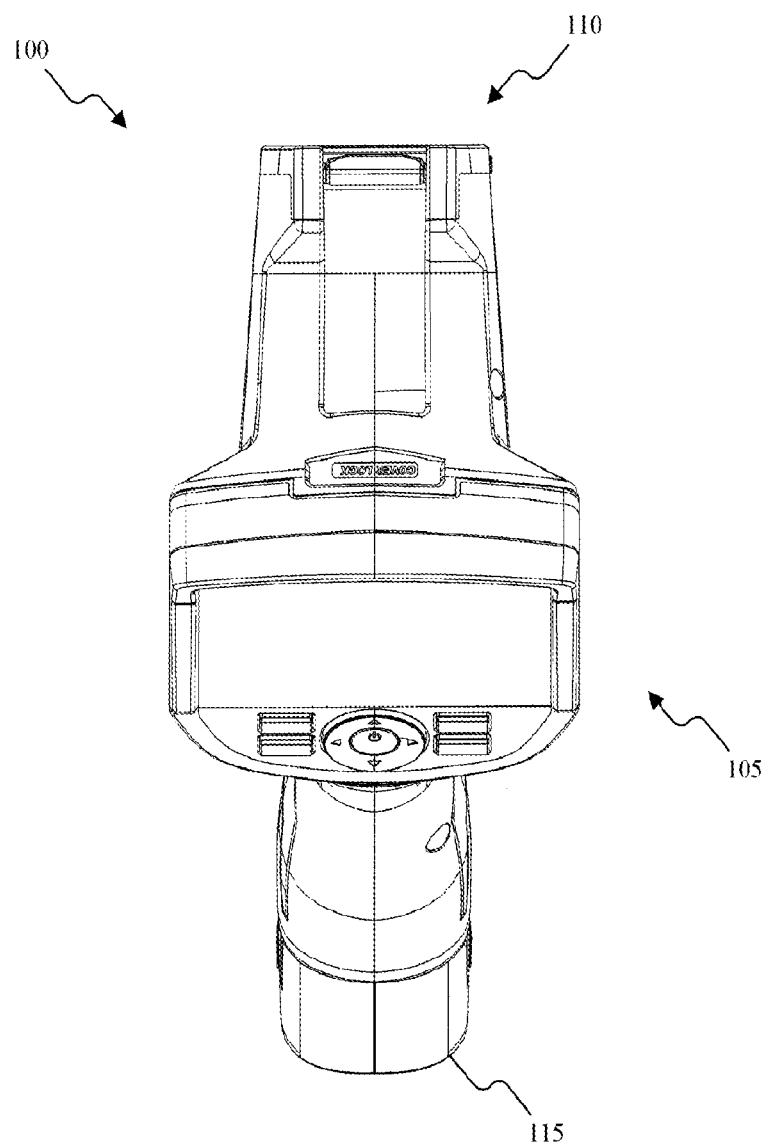
Figure 1G:
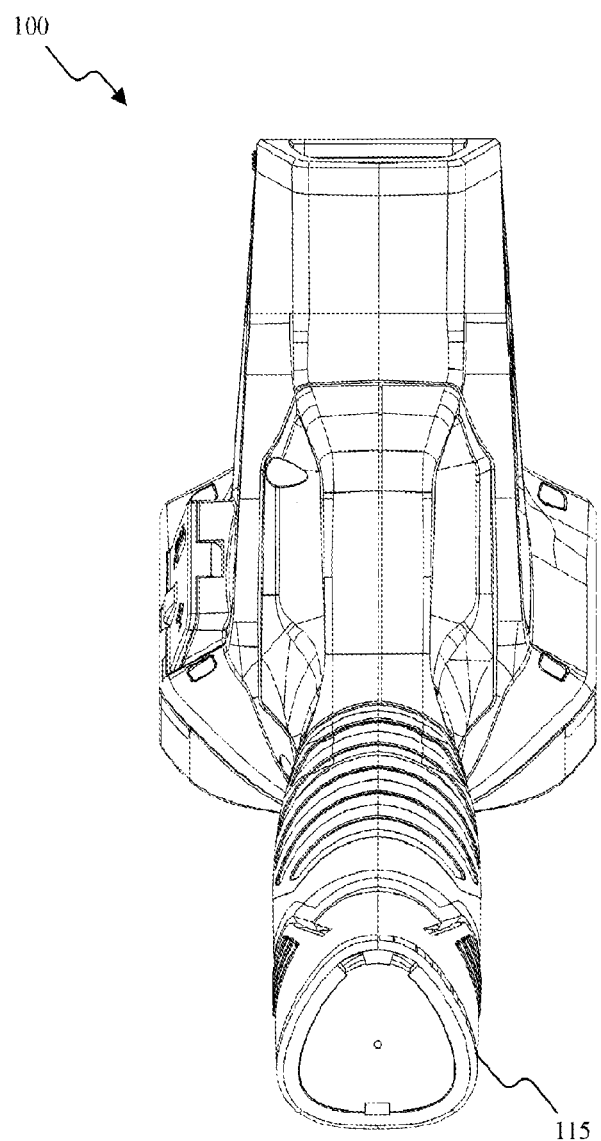

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein relate to thermal detection devices which detect and display a temperature characteristic of a scene. The thermal detection devices include a housing having a display portion, a user interface portion, a worklight portion, and a trigger portion. The thermal detection devices also include an optics portion, a thermal detector, and a controller or control module for receiving signals from, among other things, the thermal detector, the trigger portion, and the user interface portion, conditioning and processing the received signals, and outputting the conditioned and processed signals to, for example, the display portion, the worklight portion, and the thermal detector. The thermal detection devices are powered by a removable and rechargeable battery pack which is inserted into a battery pack receiving interface of the housing. The thermal detector is, for example, a thermopile array.

FIGS. 1A-1G illustrate a thermal detection device or thermal imaging device 100. The thermal detection device 100 includes a housing 105, a lens cover 110, and a battery pack 115. The housing 105 includes a handle 120, a trigger portion 125, a worklight portion 130, a detection portion (not shown), a user input portion 135, and a display portion 140. The lens cover 110 is, for example, threadedly coupled to the housing 105 to protect one or more lens components and the detection portion (e.g., a thermal detector or infrared sensor). The one or more lenses are a part of the detection portion. In some embodiments, the thermal detection device 100 also includes a laser pointer. The laser pointer is projected to, for example, the center of a detection area to aid the user in locating the detection area.

Figure 2:
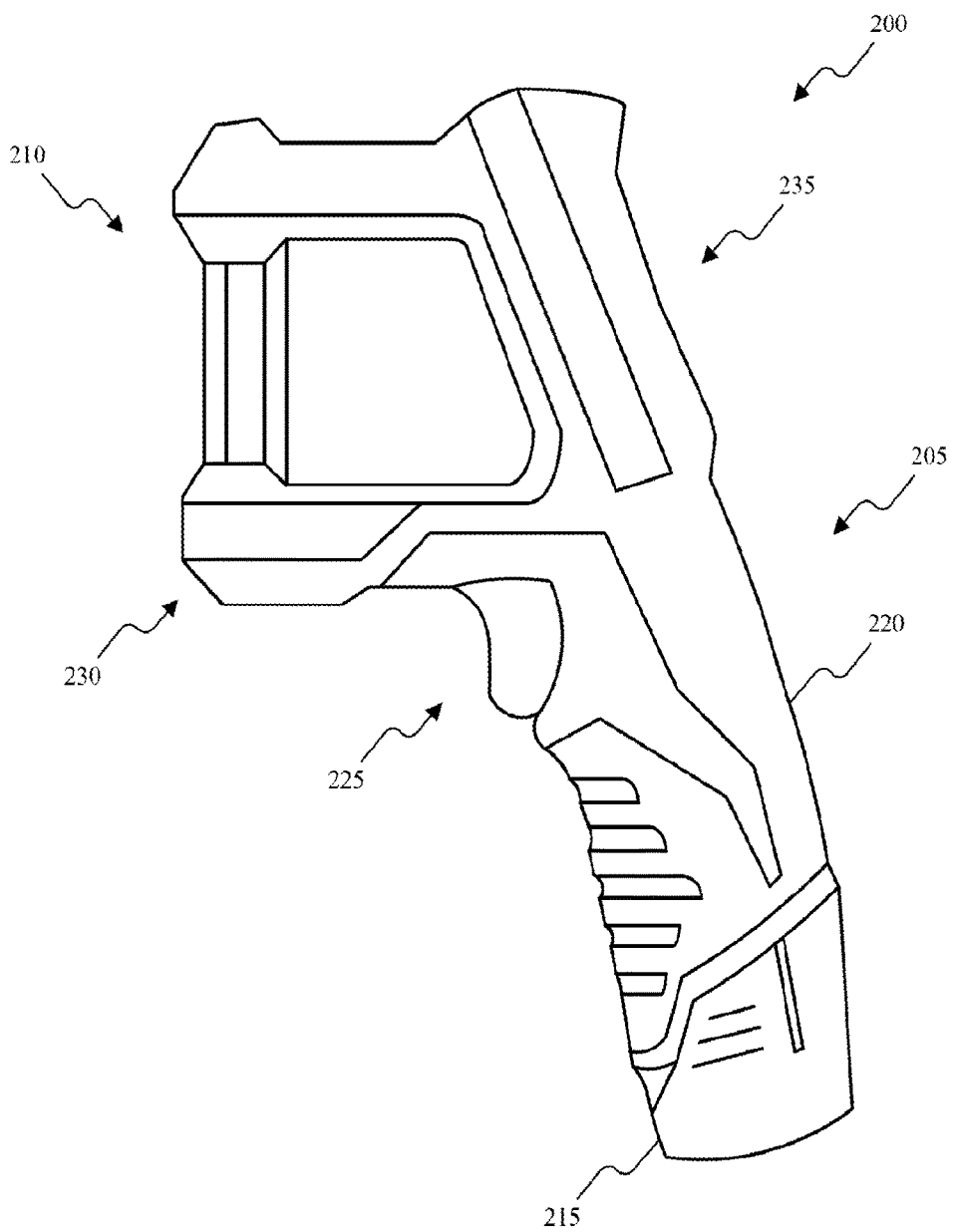
FIG. 2 is a perspective view of a thermal detection device according to another embodiment of the invention.
Figure 3:
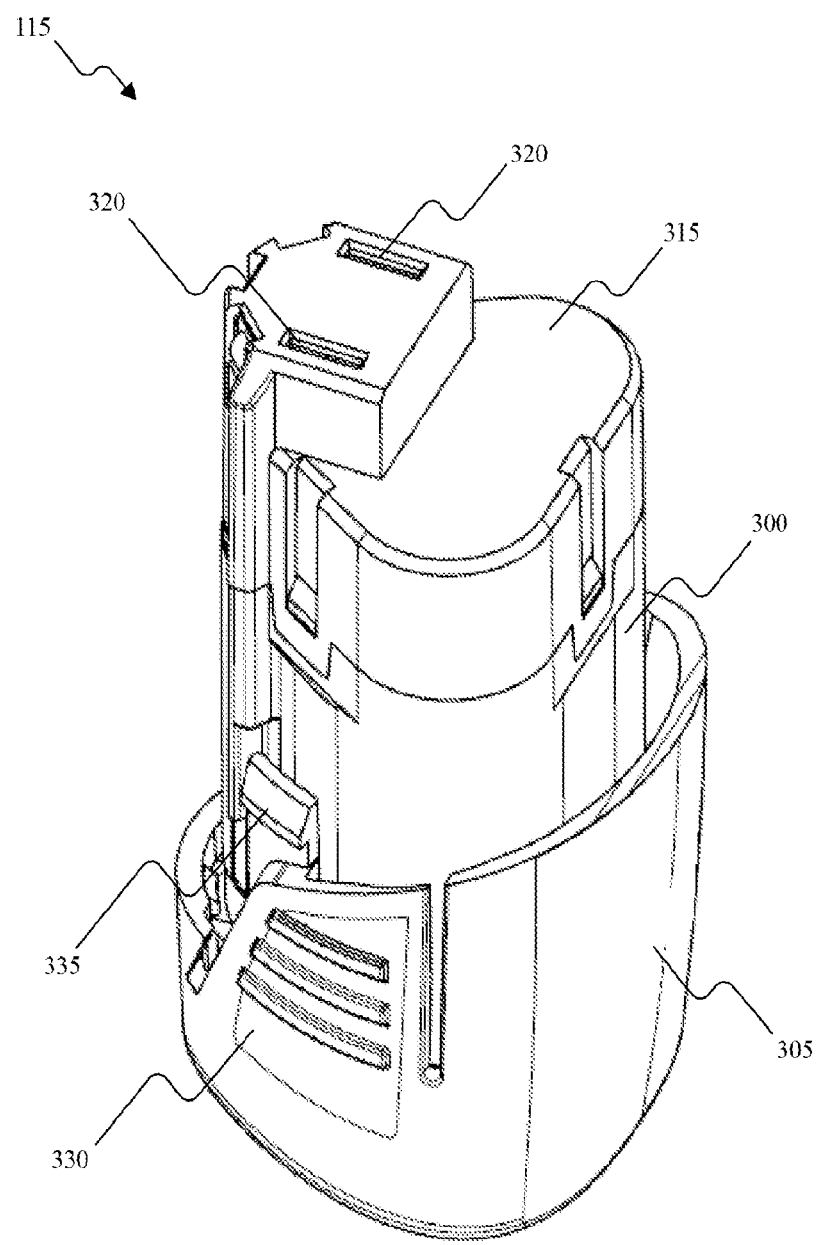
FIG. 3 is a perspective view of a battery pack according to an embodiment of the invention.

FIG. 2 illustrates another thermal detection device or thermal imaging device 200. The thermal detection device 200 is similar to the thermal detection device 100, and includes a housing 205, a lens cover 210, and a battery pack 215. The housing 205 includes a handle 220, a trigger portion 225, a worklight portion 230, a detection portion (not shown), and a user input and display portion 235. Embodiments of the invention described herein are described with respect to the thermal detection device 100.

The detection portion 100 includes, among other things, the thermal detector, optics for the thermal detection device, a visual camera, and a shutter mechanism. In some embodiments, the optics for the thermal detection device 100 include a single selectable or focusable lens configuration. In other embodiments, the optics for the thermal detection device 100 include a dual lens configuration. The lenses are made of, for example, glass, quartz glass, fluorite, plastic, acrylic, Germanium, or the like. The lenses have a depth of focus of approximately 2-6 feet. Dual lens configurations are implemented in embodiments of the invention in which, for example, improved resolution is desired. In dual lens embodiments, the inner lens is fixed, and the second lens is, for example, an aspheric lens. Embodiments of the invention described herein relate to single lens implementations of the thermal detection device 100.

The thermal detector is, for example, a 32 pixel by 31 pixel (i.e., 32×31) thermopile array (i.e., thermal engine) positioned at the front end of the thermal detection device 100. As such, the thermopile array generates signals corresponding to a thermal image that is 32 pixels wide and 31 pixels long. In other embodiments, the thermal detector is a 160 pixel by 120 pixel (i.e., 160×120) un-cooled microbolometer and generates signals corresponding to a thermal image that is 160 pixels wide and 120 pixels long. Each pixel of the microbolometer provides temperature measurements having an accuracy within approximately 2%. In still other embodiments, a cooled microbolometer is used, or a microbolometer is used in combination with a thermopile array to achieve, for example, power compensation. In some embodiments, the thermal detection device 100 is not configured to provide absolute temperatures of a scene. In other embodiments, the thermal detection device 100 is configured to output absolute temperatures of a scene. The refresh rate of the thermal detector is set to, for example, less than or equal to 9 Hz in accordance with government regulations.

As is described in greater detail below with respect to a compensation module, the thermal detector is highly sensitive to heat and temperature changes. In order to properly compensate for this sensitivity, sensors are used to measure temperature fluctuations caused by both internal and external heat sources.

The visual camera is located at the front end of thermal detection device 100 and below the thermal detector. The visual camera is covered by a clear plastic shield for protection. The visual camera has a resolution of between, for example, 1 and 12 megapixels. In some embodiments, the thermal detection device 100 includes two or more visual cameras. Images are captured by activating (e.g., depressing, releasing, holding, etc.) the trigger portion. In some embodiments, a single image based on the thermal detector and a single image based on the visual camera is captured at the time the trigger portion is activated. For example, each time the trigger portion is activated, a single visual image is captured and a single visual-thermal blended image is captured. Each image is saved as a separate file having, for example, a corresponding time-stamp for identification. In some embodiments, when the trigger portion is activated, the image that is being displayed by the display portion is captured. In other embodiments, a series of images are captured based on the amount of time that the trigger is activated. The visual camera is also configured for manual or automatic focusing and at least one of the visual camera module or controller (both described below) is configured to execute one or more extended depth of focus ("EDOF") techniques. The visual camera refresh rate is approximately, for example, 30 Hz. Higher refresh rates are possible for the visual camera, but the perceptual effects of the increase in refresh rate are virtually indistinguishable by the human eye.

The display portion 140 and user interface portion 135 include a visual display and one or more user input devices (e.g., buttons), respectively. The visual display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), or the like. In some embodiments, the display is a 3.5" thin-film transistor ("TFT") LCD. In other embodiments, the display is a Super active-matrix OLED ("AMO-LED") display. Displays are often rectangular in shape, and the outputs of the visual camera or thermal detector are often square in shape. As such, following the mapping of an output of a visual camera or thermal detector to the output display, there are unused pixels around the edges of the display. The output of the visual camera, the output of the thermal detector, or a combination of the two can be stretched to fit the screen. Additionally or alternatively, the unused pixels are black, or information is displayed in the unused pixels (e.g., menus, temperature data, etc.). The refresh rate of the display portion is approximately, for example, 30 Hz.

Figure 4:
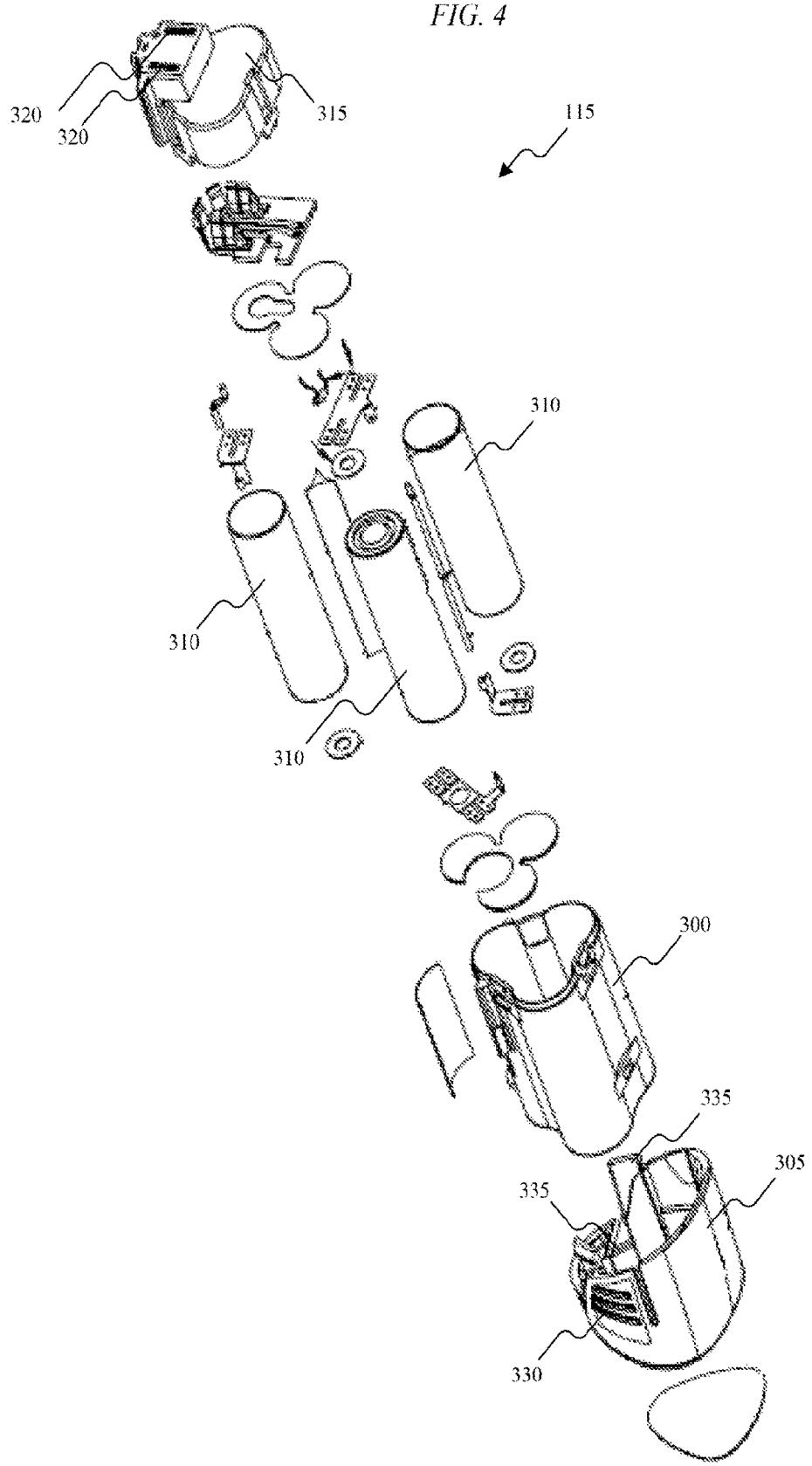
FIG. 4 is an exploded view of the battery pack of FIG. 3.

The housing 105 includes a battery pack interface within the handle 120 of the thermal detection device 100 for receiving the battery pack 115. The battery pack 115 includes a casing 300, an outer housing 305 coupled to the casing 300, and a plurality of battery cells 310 (see FIG. 4) positioned within the casing 300. The casing 300 is shaped and sized to fit within the recess of the thermal detection device handle 120 to connect the battery pack 115 to the thermal detection device 100. The casing 300 includes an end cap 315 to substantially enclose the battery cells 310 within the casing 300. The illustrated end cap 315 includes two power terminals 320 configured to mate with corresponding power terminals of the thermal detection device 100. In other embodiments, the end cap 315 may include terminals that extend from the battery pack 115 and are configured to be received in receptacles supported by the thermal detection device 100. The end cap 315 also includes sense or communication terminals 325 (see FIG. 5) that are configured to mate with corresponding terminals from the thermal detection device 100. The terminals 325 couple to a battery circuit (not shown). The battery circuit can be configured to monitor various aspects of the battery pack 115, such as pack temperature, pack and/or cell state of charge, etc. and can also be configured to send and/or receive information and/or commands to and/or from the thermal detection device 100. In one embodiment, the battery circuit operates as illustrated and described in U.S. Pat. No. 7,157,882 entitled "METHOD AND SYSTEM FOR BATTERY PROTECTION EMPLOYING A SELECTIVELY-ACTUATED SWITCH," issued Jan. 2, 2007, the entire content of which is hereby incorporated by reference. In another embodiment, the battery circuit operates as illustrated and described in U.S. Pat. No. 7,589,500 entitled "METHOD AND SYSTEM FOR BATTERY PROTECTION," issued Sep. 15, 2009, the entire content of which is also hereby incorporated by reference.

The casing 300 and power terminals 320 substantially enclose and cover the terminals of the thermal detection device 100 when the pack 115 is positioned in the handle 120. That is, the battery pack 115 functions as a cover for the handle 120 and terminals of the thermal detection device 100. Once the battery pack 115 is disconnected from the device 100 and the casing is removed from the handle 120, the battery terminals on the thermal detection device 100 are generally exposed to the surrounding environment.

The outer housing 305 is coupled to an end of the casing 300 substantially opposite the end cap 315 and surrounds a portion of the casing 300. In the illustrated construction, when the casing 300 is inserted into or positioned within the handle 120 of the thermal detection device 100, the outer housing 305 generally aligns with an outer surface of the handle 120. In this construction, the outer housing 305 is designed to substantially follow the contours of the device 100 to match the general shape of the handle 120. In such embodiments, the outer housing 305 generally increases (e.g., extends) the length of the handle 120 of the thermal detection device 100.

In the illustrated embodiment, two actuators 330 (only one of which is shown) and two tabs 335 are formed in the outer housing 305 of the battery pack 115. The actuators 330 and the tabs 335 define a coupling mechanism for releasably securing the battery pack 115 to the thermal detection device 100. Each tab 335 engages a corresponding recess formed in the thermal detection device 100 to secure the battery pack 115 in place. The tabs 335 are normally biased away from the casing 300 (i.e., away from each other) due to the resiliency of the material forming the outer housing 305. Actuating (e.g., depressing) the actuators 330 moves the tabs 335 toward the casing 300 (i.e., toward each other) and out of engagement with the recesses such that the battery pack 115 may be pulled out of the handle 120 and away from the thermal detection device 100.

Figure 5:
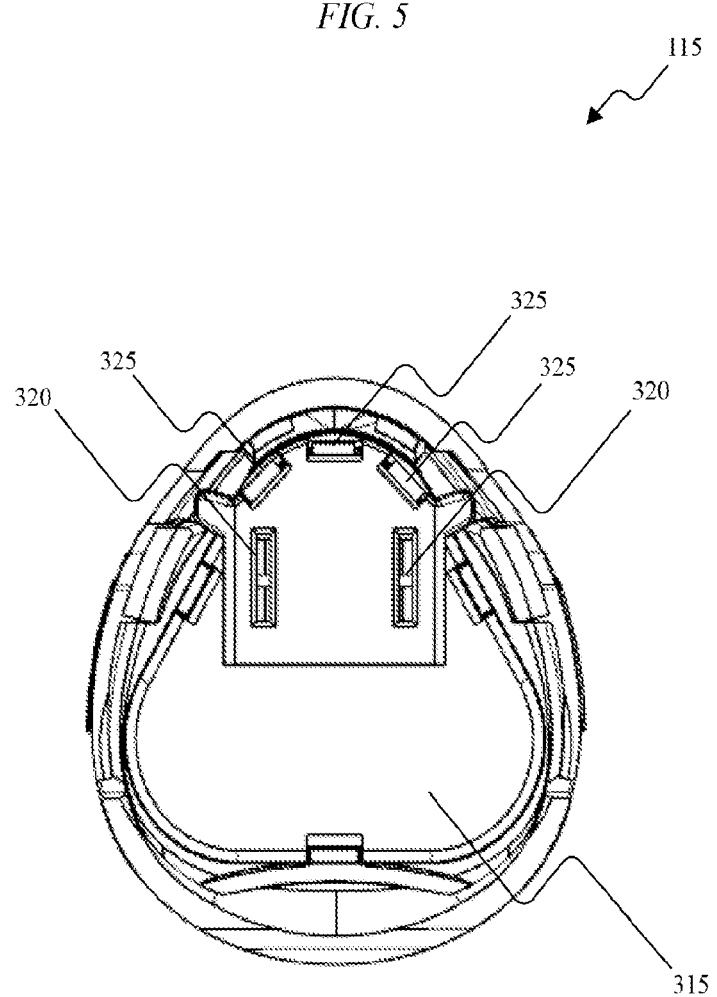
FIG. 5 is a top-view of the battery pack of FIG. 3.

As shown in FIG. 5, the battery pack 100 includes three battery cells 310 positioned within the casing 300 and electrically coupled to the terminals 320. The battery cells 310 provide operational power (e.g., DC power) to the thermal detection device 100. In the illustrated embodiment, the battery cells 310 are arranged in series, and each battery cell 310 has a nominal voltage of approximately four-volts ("4.0V"), such that the battery pack 115 has a nominal voltage of approximately twelve-volts ("12V"). The cells 310 also have a capacity rating of approximately 1.4 Ah. In other embodiments, the battery pack 115 may include more or fewer battery cells 310, and the cells 310 can be arranged in series, parallel, or a serial and parallel combination. For example, the battery pack 115 can include a total of six battery cells 310 in a parallel arrangement of two sets of three series-connected cells. The series-parallel combination of battery cells 310 creates a battery pack 115 having a nominal voltage of approximately 12V and a capacity rating of approximately 2.8 Ah. In other embodiments, the battery cells 310 may have different nominal voltages, such as, for example, 3.6V, 3.8V, 4.2V, etc., and/or may have different capacity ratings, such as, for example, 1.2 Ah, 1.3 Ah, 2.0 Ah, 2.4 Ah, 2.6 Ah, 3.0 Ah, etc. In other embodiments, the battery pack 115 can have a different nominal voltage, such as, for example, 10.8V, 14.4V, etc. In the illustrated embodiment, the battery cells 310 are lithium-ion battery cells having a chemistry of, for example, lithium-cobalt ("Li—Co"), lithium-manganese ("Li—Mn"), or Li—Mn spinel. In other embodiments, the battery cells 310 may have other suitable lithium or lithium-based chemistries.

The battery pack 115 is also configured to connect and provide power to additional devices such as drills, saws, grease guns, right angle drills, pipe cutters, lasers, impact wrenches, impact drivers, reciprocating saws, inspection cameras, radios, worklights, screwdrivers, wall scanners, infrared thermometers, clamp meters, digital multimeters, fork meters, multi-tools, grinders, band saws, jig saws, circular saws, rotary hammers, generators, vacuums, and the like.

Figure 6:
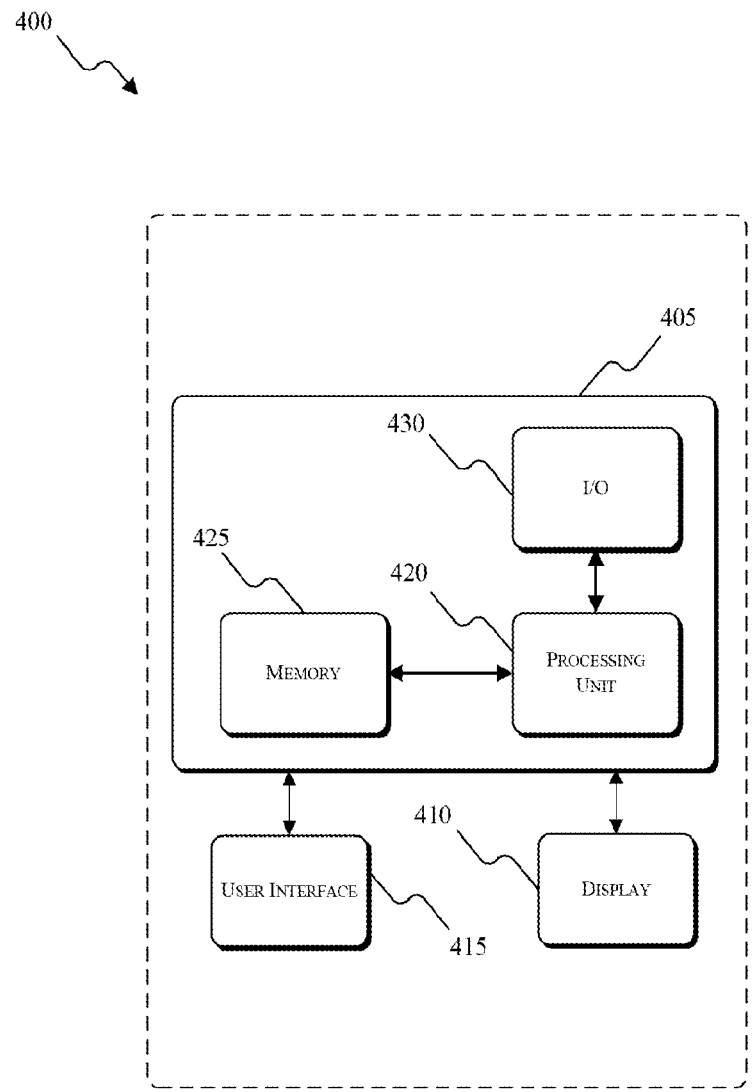
FIG. 6 illustrates a thermal detection device according to another embodiment of the invention.

In some embodiments, a battery pack controller (not shown) is configured to provide information related to a battery pack temperature or voltage level to a controller of the thermal detection device 100, such as the thermal detection device controller 405 shown in and described with respect to FIG. 6. The thermal detection device controller 405 and the battery pack controller also include low voltage monitors and state-of-charge monitors. The monitors are used by the thermal detection device controller 405 or the battery pack controller to determine whether the battery pack 115 is experiencing a low voltage condition which may prevent proper operation of the thermal detection device 100, or if the battery pack 115 is in a state-of-charge that makes the battery pack 115 susceptible to being damaged. If such a low voltage condition or state-of-charge exists, the thermal detection device 100 is shut down or the battery pack 115 is otherwise prevented from further discharging current to prevent the battery pack 115 from becoming further depleted.

Figure 7:
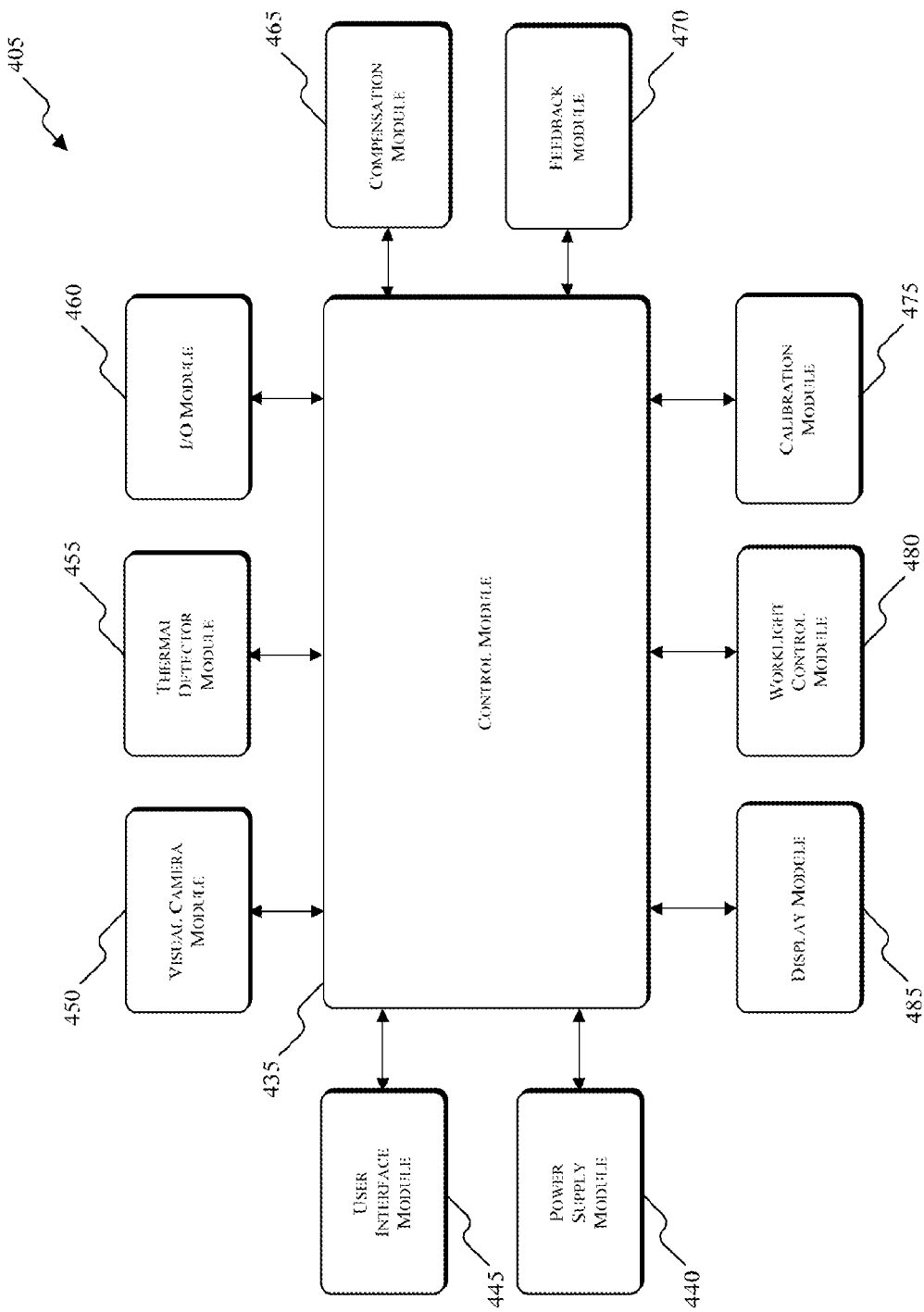
FIG. 7 illustrates a controller according to an embodiment of the invention.

The thermal detection devices 100 and 200 described above are illustrated modularly as a thermal detection device 400 in FIGS. 6 and 7. The shape and structure of the thermal detection device 400 is described above with respect to the thermal detection devices 100 and 200. The thermal detection device 400 generally includes, among other things, the controller 405, a display 410, and a user interface 415. The controller 405 is implemented on, for example, a printed circuit board ("PCB"). The PCB (not shown) is populated with a plurality of electrical and electronic components which provide operational control and protection to the thermal detection device 400. In some embodiments, the PCB includes a control or processing unit 420 such as a microprocessor, a microcontroller, or the like, a memory 425, an input/output ("I/O") interface 430, and a bus. The bus connects various components of the controller 405 including the memory to the processing unit. The memory 425 includes, in many instances, read only memory ("ROM"), such as an electrically erasable programmable read-only memory ("EEPROM"), and random access memory ("RAM"). The controller 405 also includes an input/output system that includes routines for transferring information between components within the controller 405. Software included in the implementation of the thermal detection device 400 is stored in the memory of the controller 405. The software includes, for example, firmware applications and other executable instructions. In other embodiments, the controller 405 can include additional, fewer, or different components.

The PCB also includes, among other things, a plurality of additional passive and active components such as resistors, capacitors, inductors, integrated circuits, and amplifiers. These components are arranged and connected to provide a plurality of functions to the PCB including, among other things, filtering, signal conditioning, and voltage regulation. For descriptive purposes, the PCB and the electrical components populated on the PCB are collectively referred to as "the controller" 405. The controller 405 includes or receives signals from the sensors or components within the thermal detection device 100, conditions and processes the signals, and transmits processed and conditioned signals to, for example, the display.

With reference to FIG. 7, the controller 405 includes one or more modules configured to provide operative control to the thermal detection device 400. The modules include, for example, hardware, software, or a combination of hardware and software configured to achieve the desired function of each module. As an illustrative example, each module can include hardware (e.g., electrical circuit components, displays, sensors, etc.) and software (e.g., functions, subroutines, executable programs, etc.) associated with the functional and operative control of the module.

In the illustrated embodiment, the controller 405 includes a control module 435. The control module 435 is connected to a plurality of additional systems or modules within the thermal detection device 400, such as a power supply module 440, a user interface module 445, a visual camera module 450, a thermal detection module 455, an I/O module 460, a compensation module 465, a feedback module 470, a calibration module 475, a worklight control module 480, and a display module 485. Although the modules 440-485 are illustrated as being separate from and connected to the control module 435, in some embodiments of the invention, one or more of the modules 440-485 are integrated into the control module 435. In some embodiments, the modules 440-485 also include electric and electronic components similar to those described above with respect to the controller 405 to perform or enable a variety of functions of the thermal detection device 400. Additionally, other embodiments of the invention include more, fewer, or different modules coupled to or integrated with the control module 435. The control module 435, the modules 440-485, or combinations of the control module 435 and modules 440-485 are used to execute the control and operational functions of the thermal detection device 400 described herein.

The power supply module 440 is electrically connected to the battery pack 115 for receiving power. The power supply module 440 includes electrical components (e.g., resistors, capacitors, diodes, transistors, amplifiers, etc.) to regulate and condition power for the various modules and components within the thermal detection device 400. For example, the power supply module 440 is configured to produce a variety of different levels of voltage for the various modules and components of the thermal detection device 400 depending on the power requirements of the various modules and components. In some embodiments, the power supply module 440 produces regulated and conditioned voltages between approximately 0.7 volts and 12.0V.

Power from the power supply module 440 is distributed to various modules and components within the thermal detection device 400. In some embodiments, the power supply module 440 continuously provides power to, for example, the control module 435 when the thermal detection device 400 is powered up (i.e., turned on). Additionally or alternatively, the power supply module 440 does not provide power to various modules or components until a signal from the control module 435 indicating that power should be supplied to the module or components is received. For example, the worklight control module 480 does not receive power from the power supply module 440 until the power supply module 440 receives an indication from the control module 435 that the worklight control module 480 is to receive power. In other embodiments, the user activates or selects a button to open or close a switch to provide power to one or more of the modules (e.g., closing a switch to power the worklight). In some embodiments, the user interface module 445, the visual camera module 450, the thermal detector module 455, the I/O module 460, the compensation module 465, the feedback module 470, the calibration module 475, and the display module 485 receive power only after a user activates one or more switches and/or the control module 435 provides a signal to the power supply module 440. The power supply module 440 can also be directly connected to various others of the modules 445-485 within the thermal detection device 400.

The user interface module 445 includes or receives signals from a plurality of switches (e.g., buttons) associated with the control and operation of the thermal detection device 400 (e.g., selecting temperature ranges for display, selecting display colors or color palettes, selecting or setting image review options, selecting operational modes, selecting display modes, selecting displayed information, and the like). The user interface module 445 includes, for example, a power button for turning the thermal detection device 400 on and off, a review button for reviewing capture images, a worklight button for turning the LED worklight on and off, a toggle button for toggling between a visual image display mode and a blended image display mode, a menu button for accessing one or more menus of the thermal detection device 400, navigation buttons (e.g., up, down, left, right, etc.) for navigating through the one or more menus or stored images, a trigger for capturing images, and a select button for making one or more selections from, for example, the one or more menus. In some embodiments, any of the above buttons can be combined such that a single button has multiple functions (e.g., the select button is also used to turn the thermal detection device 400 on and off, etc.).

As an illustrative example, the user interface module 445 receives signals from the trigger portion 125. The actuation or depression of the trigger portion 125 generates a signal which is received by the user interface module 445 and indicative of a desire to capture an image of the scene. The user interface module 445 sends the signal to the control module 435 or the thermal detector module 455 to capture the image. Similarly, control buttons related to the operational mode or display mode of the thermal detection device 400 generate signals that are received by the user interface module 445. The user interface module 445 transmits the signals to the control module 435 or another module within the thermal detection device 400 to correspondingly control the operational or display mode of the thermal detection device 400. For example, the thermal detection device 400 includes a "hot key" or toggle to switch between images that were captured using the thermal detection device 400. In some embodiments, the hot key is a physical button that is actuated to uni-directionally scroll through captured images. In other embodiments, two or more buttons are used to scroll through captured images in multiple directions (e.g., forward, reverse, etc.). To facilitate the review of images on the thermal detection device 400, the buttons can be used to access a folder or directory view of stored images which allows the user to access and view images which were previously captured using the thermal detection device 400. In some embodiments, the user interface module 445 is included in or integrated with the display module 485 (e.g., when the display module 485 includes a touch-screen display).

The visual camera module 450 includes or receives signals from one or more visual cameras as described above. The visual camera module 450 sends electrical signals corresponding to a sensed visual scene to the control module 435 for processing, or directly to the display module 485 for display. The visual camera module 450 receives power from the power supply module 440 and is configured to receive one or more control signals from the control module 435. For example, the control module 435 provides the visual camera module 450 with one or more signals corresponding to settings of the one or more visual cameras. The settings of the visual cameras can include brightness, contrast, etc. In some embodiments, the visual camera module 450 receives signals from the thermal detector module 455, the feedback module 470, the compensation module 465, etc. The visual cameral module 450 uses these signals as feedback and adjusts settings of the visual cameras in response. Alternatively, the control module 435 receives the signal from the thermal detector, determines what changes should be made to the operation of the visual camera, and sends signals to the visual camera module 450 to modify one or more settings.

In some embodiments, parallax correction is achieved using a first visual camera on a first side of the thermal detector and a second visual camera on a second side of the thermal detector. The two visual camera implementations allow electronics (e.g., the control module 435) to perform geometric calculations to correct for parallax error between the visual cameras and the thermal detector. In other embodiments, electronics are used to correct for parallax error for a single visual camera.

The thermal detector module 455 receives signals from and transmits signals to the thermal detector. The signals received from the thermal detector include, for example, output signals related to the amount of thermal radiation detected by the thermal detector. The signals transmitted by the thermal detector module 455 to the thermal detector include, for example, temperature compensation signals, as described below. In some embodiments, the thermal detector module 455 is configured to perform signal conditioning and processing on the output signals received from the thermal detector. In other embodiments, and as described below, the signal conditioning and processing can also be performed by the control module 435. The signal conditioning and processing includes, among other things, upscaling (e.g., interpolation), temperature compensation, normalization, and the like. In some embodiments, the thermal detector is included in the thermal detector module 455.

The I/O module 460 includes one or more ports for, among other things, storing or retrieving data from the thermal detection device 400. For example, the I/O module 460 includes one or more USB ports, one or more SD card slots, one or more FireWire ports, a serial port, a parallel port, etc. In some embodiments, the thermal detection device 400 includes an ability to transmit or receive information over a wireless short-range communications network employing a protocol such as, for example, Bluetooth, ZigBee, Wi-Fi, or another suitable short-range communications protocol. The I/O module 460 allows a user to retrieve images stored in an internal memory, such as memory 425, of the thermal detection device 400 and transfer them to, for example, a personal computer, phone, laptop, PDA, tablet computer, e-book reader, television, or the like. The images are stored as a file type such as JPEG, TIFF, PNG, GIF, BMP, etc. In some embodiments, the thermal detection device 400 includes a limited amount of memory, and an SD or microSD card is inserted into the thermal detection device 400 to store captured images. The SD card can be removed from the thermal detection device 400 and inserted into a corresponding port on any of the previously mentioned devices. In some embodiments, the thermal detection device 400 is configured to capture still images and store them to the SD card or another suitable memory of the thermal detection device 400. In other embodiments, the thermal detection device 400 is configured to capture still images and video of a scene. In embodiments of the invention in which the SD card is the only or primary storage medium, the absence of an SD card in the thermal detection device 400 may prevent the thermal detection device 400 from being able to store images. In embodiments of the thermal detection device 400 that include both an SD card slot and a USB port, and an SD card is present in the SD card slot, inserting a USB cable into the USB port can cause the images stored on the SD card to be automatically downloaded to, for example, a computer.

The images captured by the thermal detection device 400 can be stored or saved to memory in a variety of different ways. For example, upon the activation of the trigger, three sets of information can be saved. A first set of information corresponds to a visual image (e.g., captured using a CCD-type camera). The visual image is associated with a scene being imaged and corresponds to a first FOV and a first spectrum of electromagnetic radiation. A second set of information corresponds to a thermal image. The thermal image is associated with the scene being imaged and corresponds to a second FOV and a second spectrum of electromagnetic radiation. The thermal image is, for example, the portion of the scene being imaged that is displayed on the display at the time the trigger is activated. The thermal image is related to a first range of temperatures (e.g., the range of temperatures detected by the thermal detection device, a user-defined range of temperatures, an automatic range of temperatures, etc.), and is color coded to provide an indication to a user of the relative and/or absolute temperatures within the imaged scene. The second FOV may be different that the first FOV (e.g., as a result of differences in visual and thermal imaging technologies). In some embodiments, a temperature gradient, a maximum temperature, a minimum temperature, an average temperature, a selected range of temperatures, etc., are displayed by the thermal detection device 400 and are included in the thermal image. A third set of information corresponds to a set of thermal data captured by the thermal detection device 400. The third set of data is associated with a third spectrum of electromagnetic radiation. For example, the third set of information includes a full set of pixel-by-pixel temperature data gathered by the focal plane array, microbolometer, etc. The third set of information can also include calibration parameters, camera settings, temperature range settings, color scale information, maximum temperatures, minimum temperatures, etc.

Figure 8:
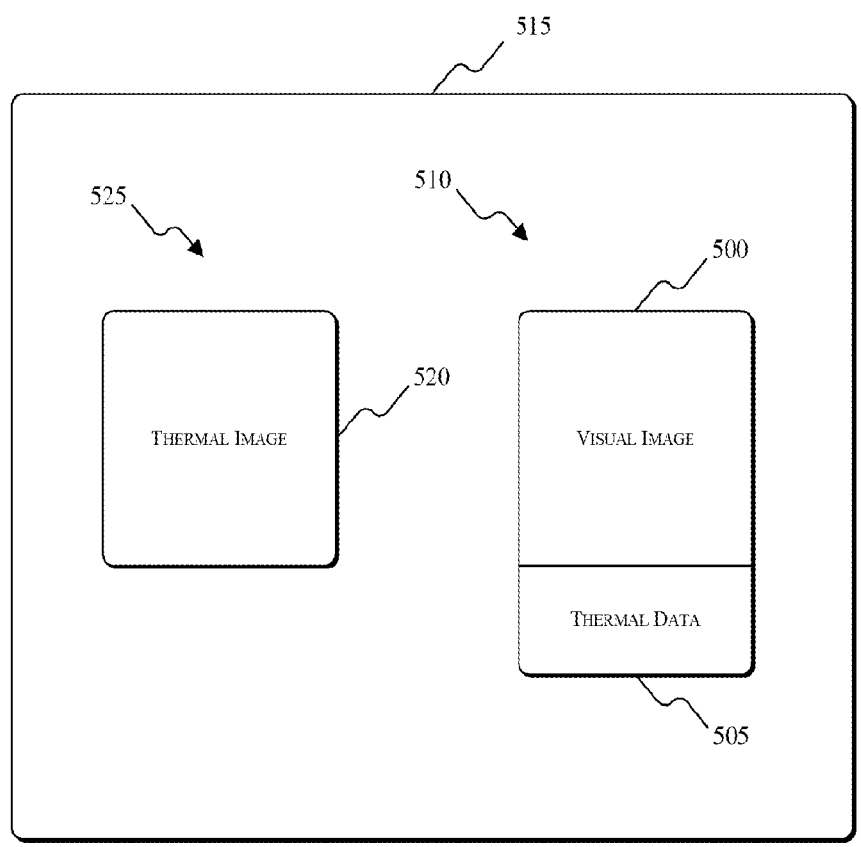
FIG. 8 illustrates a memory for storing captured images and data according to one embodiment of the invention.
Figure 9:
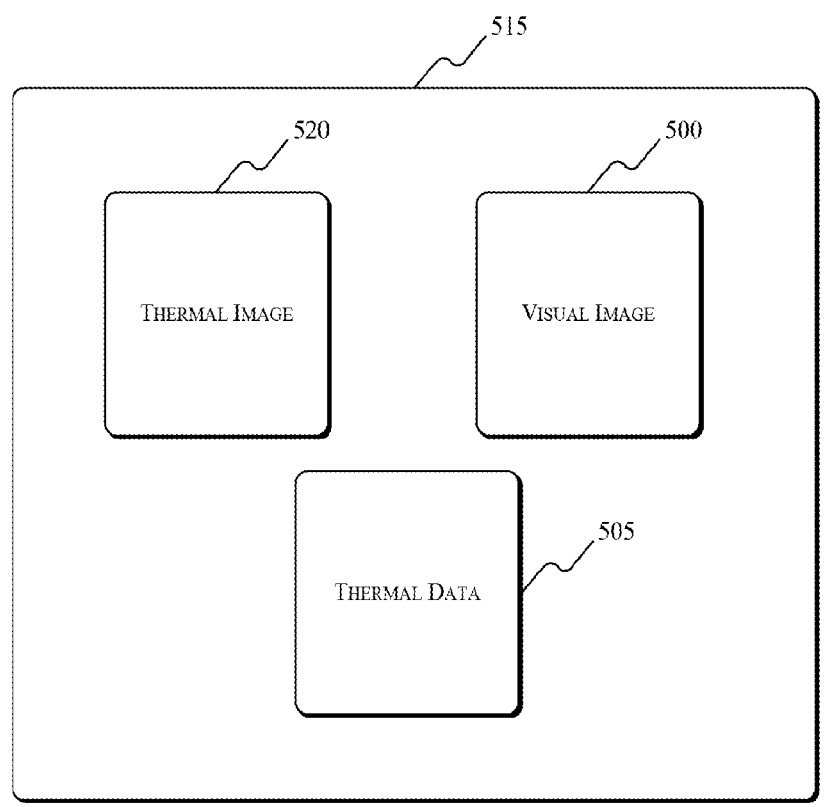
FIG. 9 illustrates a memory for storing captured images and data according to another embodiment of the invention.

The visual image, the thermal image, and the set of thermal data can be stored to memory as one or more individual files. For example, in the embodiment illustrated in FIG. 8, a visual image 500 and a set of thermal data 505 are combined (e.g., the thermal data 505 is appended to the visual image 500) into a first file 510 within a memory 515. As such, the first file 510 corresponds to the first spectrum of electromagnetic radiation, which is not associated with a temperature of the scene being imaged, and the third spectrum of electromagnetic radiation which is associated with the temperature of the scene being imaged. A thermal image 520 is stored as a second file 525 that is separate from the first file 510, and corresponds to the second spectrum of electromagnetic radiation. As illustrated in the embodiment of FIG. 9, the visual image 500, the thermal image 520, and the thermal data 505 are also each able to be stored as separate files within the memory 515.

With reference once again to FIG. 7, the compensation module 465 is configured to perform a variety of compensation functions for the thermal detection device 400. For example, the thermal detector (e.g., the thermopile array, the microbolometer, etc.) is highly sensitive to variations in temperature (e.g., ambient temperature). The pixels of the thermal detector also do not change uniformly. The pixels along the edges of the thermal detector have a tendency to be affected by variations in ambient temperature more quickly than the pixels at the interior of the thermal detector. To compensate for these effects, the compensation module 465 includes (e.g., stores in a memory) or generates a thermal gradient map for the thermal detector. The gradient map corresponds to the manner in which each pixel of the thermal detector is affected by variations in temperature. The gradient map is then used to compensate the output pixel values for each pixel of the thermal detector. In some embodiments, the compensation module 465 detects a rate at which the ambient temperature of the thermal detection device 400 or the environment around the thermal detection device is changing. The rate at which the ambient temperature is changing is used to modify, for example, the rate at which the output of the thermal detector is compensating, a thermal gradient map that is being used for compensation, etc.

In some embodiments, the ambient temperature of the thermal detection device 400, the ambient temperature of the thermal detector, or the temperature of one or more pixels of the thermal detector is adjusted by the compensation module 465 such that it matches a temperature of a target within a scene. Heat can be applied to each pixel in the thermal detector or the peripheral pixels in the thermal detector to adjust the temperature of the thermal detector. For example, an array of temperature sensors are positioned around the thermal detector (e.g., around the edges of the thermal detector) to sense the temperature of one or more pixels in the thermal detector. The output signals from the temperature sensors are used to determine which portions of the thermal detector are different from the temperature of the target within the scene. In some embodiments, the temperature sensors are used in combination with a thermal gradient map for the thermal detector to determine which portions of the thermal detector need to be heated or cooled to match the temperature of the target within the scene. Additionally or alternatively, the compensation module is configured to match the ambient temperature of the thermal detection device 400, the ambient temperature of the thermal detector, or the temperature of one or more pixels of the thermal detector to an ambient temperature or average temperature of an environment near the thermal detection device 400.

In some embodiments, a second thermopile array is used to source heat to the thermal detector and control the temperature of the thermal detector. Although additional power is required to, for example, supply heat to the thermal detector to match the temperature of the target within the scene, the use of a higher power battery pack (e.g., 12V) enables the thermal detection device to perform the temperature matching without sacrificing other features or functions of the thermal detection device 400.

The feedback module 470 is configured to generate signals which are used to control the operation of the thermal detection device 400. For example, the feedback module 470 receives signals related to the amount of light detected by the visual camera, the amount of thermal radiation detected by the thermal detector, an ambient temperature, an average temperature, distances, etc. and generates one or more control signals in response. The signals generated by the feedback module 470 are then sent to, for example, the control module 435, the visual camera module 450, the thermal detector module 455, the display module 485, the worklight control module 480, etc. The signals sent to the visual camera module 450 are used to control, among other things, brightness settings, contrast settings, and other image quality settings. The signals sent to the visual camera module 450 are in response to, for example, the amount of thermal radiation detected by the thermal detector or infrared sensor. The signals sent to the display module 485 include temperature measurements or calculations, distance measurements or calculations, and the like. These signals are used to control, among other things, displayed temperature values, displayed FOV information, and the like. The signals sent to the worklight control module 480 are used to control, for example, the amount of light output by the worklight. Additionally or alternatively, each signal is first sent to the control module 435 for processing.

The calibration module 475 is configured to perform a variety of calibration functions for the thermal detection device 400. For example, the calibration module 475 has a memory that includes stored factory calibration information for the thermal detector. When the thermal detection device 400 is turned on, a self calibration and warm up is executed. In some embodiments, the calibration module 475 includes a combination of software and hardware for calibrating the thermal detector during use. For example, the thermal detection device 400 includes a shutter mechanism which blocks substantially all light from impinging the thermal detector. The shutter mechanism is intermittently (e.g., once per minute) placed in front of the thermal detector to identify baseline output values for the thermal detector and/or each pixel of the thermal detector. The calibration module 475 is configured to, among other things, control when the shutter mechanism is placed in front of the thermal detector and the period of time for which the shutter mechanism remains in front of the thermal detector. In some embodiments, the shutter mechanism remains in front of the thermal detector for one second. In other embodiments, the shutter mechanism is in front of the thermal detector for only a fraction of a second. The amount of time the shutter mechanism remains in front of the thermal detector is dependent upon, for example, the thermal detector being used, the processing power of the controller 405, the software stored in memory, etc. As such, the amount of time the shutter mechanism remains or is required to remain in front of the thermal detector is dependent upon a variety of factors and can vary from device to device.

In some embodiments, the shutter mechanism is only placed in front of the thermal detector when the thermal detection device 400 is turned on (i.e., powered up). In other embodiments, the shutter mechanism is placed in front of thermal detector at predetermined time intervals (e.g., once per minute, once every thirty seconds, etc.). Additionally or alternatively, the shutter mechanism is placed in front of the thermal detector when a substantial change in ambient temperature is detected. For example, when the thermal detection device 400 is taken from an indoor environment to an outdoor, the ambient temperature of the thermal detection device 400 and the environment around the thermal detection device 400 can undergo a substantial change. When the change in ambient temperature is detected, the calibration module 475 generates a signal causing the shutter mechanism to be placed in front of the thermal detector such that new calibration values for the thermal detector can be obtained. In some embodiments, the calibration module 475 monitors or detects a rate at which the ambient temperature is changing. If the rate at which the ambient temperature is changing is greater than a threshold value, the shutter mechanism is used for recalibration.

As previously described, the calibration module 475 is also configured to store one or more factory calibration values for the thermal detector. In some embodiments, the calibration module 475 includes a plurality of pre-use permutations associated with various operating conditions of the thermal detection device 400. In such embodiments, the calibration module 475 is configured to retrieve a calibration value from memory that corresponds to a set of operational parameters of the thermal detection device 400 (e.g., ambient temperature, thermal detector temperature, shutter mechanism temperature, etc.). The retrieved calibration values are then used in place of or in combination with the calibration values obtained using the shutter mechanism as described above.

In some embodiments, the shutter mechanism and the thermal detector are maintained at the same temperature. For example, differences between the temperature of the shutter mechanism and the temperature of the thermal detector can cause errors in detected temperatures and/or in the image that is ultimately displayed by the thermal detection device. As such, the calibration module 475 is configured to apply or sink heat from the shutter mechanism or the thermal detector such that they are maintained at the same or approximately the same temperature (e.g., within an acceptable tolerance value).

The worklight control module 480 is connected to the worklight button described above. When the user activates the worklight button, a signal from the worklight control module 480 provides a signal to the control module 435. The control module 435 selectively provides power from the power supply module 440 to the worklight control module 480 for illuminating the worklight.

The worklight provides a convenient source of light when operating the thermal detection device 400, because the thermal detection device 400 is sometimes used in dark environments; light from the worklight can be used to provide sufficient illumination for the visual camera(s). In some embodiments, the worklight includes an incandescent light bulb, one or more LEDs, or the like. In one embodiment, the worklight includes three high-intensity LEDs and has an output of, for example, 250 LUX at a distance of two feet. As such, the worklight is sufficiently powerful to illuminate an area in front of the thermal detection device 400. In some embodiments of the invention, the output of the worklight is greater than 250 LUX at a distance of two feet.

The worklight is either integral to or detachable from the thermal detection device 400. In embodiments of the invention in which the worklight is detachable from the thermal detection device 400, the worklight includes a secondary power source, and the thermal detection device 400 and the worklight include corresponding interfaces for attachment and detachment (e.g., flanges, tongues and grooves, magnets, etc.). The secondary power source is, for example, a battery that is electrically isolated from the thermal detection device 400, charged by the thermal detection device 400, or otherwise receives power from the thermal detection device 400 (e.g., wirelessly). The worklight also includes a worklight timeout period. The worklight timeout period has a preprogrammed value or the value is set by the user. If the worklight timeout period is reached or lapses and the worklight has not been turned off, the worklight is turned off to conserve power. The worklight is positioned at the front end of the thermal detection device 400, is below the thermal detector, and is covered by a clear plastic shield for protection.

In some embodiments, the output of the worklight is regulated by the control module 435, the feedback module 470, or the worklight control module 480. For example, the feedback module 470 generates one or more signals related to the amount of light detected by the visual camera, the amount of thermal radiation detected by the thermal detector, or both. These signals are sent directly to the worklight control module 480 or to the control module 435 to be processed. The worklight control module 480 receives signals indicative of a condition of the environment (e.g., the amount of light present), and modifies the output of the worklight accordingly. For example, when there is a small amount of light detected in an environment, the output of the worklight is increased. Increasing the output of the worklight increases the amount of light in the environment, and enables the combination or blending of visual and thermal images as described below.

The display module 485 receives control signals from the control module 435 and power from the power supply module 440 sufficient to illuminate, for example, one or more LEDs or a display which provides an indication of a result of a test. Among the signals received from the control module 435 are signals related to a display mode. For example, the display module 485 is configured to operate in any of a variety of display modes, such as a thermal image display mode, a visual image display mode, and a combined display mode. The display module 485 is switched among the display modes by way of, for example, one or more control signals received by the user interface module 445 (e.g., corresponding to one or more buttons being pressed or switches being activated). The display module 485 is configured to remain in a selected display mode until the user activates another button or switch indicative of a desire to change the display mode. Additional display modes include a review mode for reviewing captured images, and a menu mode in which one or more menus are displayed.

Included in the display are, for example, measured temperatures, average temperatures, ambient temperatures, indications of a detection area, a distance to a target, etc. The display also includes a crosshair positioned at the center of the display. The crosshair is used as a reference point within the displayed scene. A variety of additional display functions are based on the position of the crosshair in the displayed scene. For example, a temperature within a scene or an average temperature of a portion of the scene corresponding to the location of the crosshair is displayed on the display (e.g., in a corner of the display). In some embodiments, a circle or square is drawn around the crosshair which corresponds to, for example, approximately a 1.0° FOV about the crosshair. In other embodiments, any of a variety of polygons are used which correspond to a FOV about the crosshair. The polygon surrounding the crosshair is indicative of the approximate sensed area for the thermal detector, or at least a portion of the sensed area for which a temperature can be reliably determined. Accordingly, the polygon is resized based on the distance of the thermal detector from a target within a scene. The approximate distance of the thermal detector from the target within the scene is determined using, for example, a laser rangefinder or another similar distancing technique.

In addition to the modules 440-485 described above, the control module 435 is also configured to perform additional functions and processing related to the operation of the thermal detection device 400. As described above, the user is able to select among a variety of operational modes, display modes, and the like. The display modes include a visual camera mode, a thermal detector mode, and a blended mode. The blended mode of operation combines signals received from the thermal detector and signals received from the visual camera into a combined or blended image which is capable of being displayed on the display. The visual camera has a resolution of, for example, 160 pixels by 160 pixels (160×160). The thermal detector has a resolution of, for example, 31 pixels by 32 pixels (31×32), 64 pixels by 64 pixels (64×64), 128 pixels by 128 pixels (128×128), etc. To properly combine the signals from the visual camera and the thermal detector, the output of the thermal detector is up-scaled to match the size of the visual camera (i.e., 160×160). The output of the thermal detector is up-scaled using any of a variety of techniques, such as averaging of the closest data points, nearest neighborhood techniques, linear interpolation, pixel replication, bilinear interpolation, contrast stretching, edge detection/enhancement, MTF peaking, integration, cubic convolution, sync filters, and cubic spline interpolation. The up-scaled output of the thermal detector and the output of the visual camera can be combined or blended in any of a variety of ways, such as, for example, a multiply blend mode, a screen blend mode, overlay blend mode, a soft light blend mode, a hard light blend mode, a dodge blend mode, a color dodge blend mode, a linear dodge blend mode, a burn blend mode, a color burn blend mode, a linear burn blend mode, a divide blend mode, an addition blend mode, a subtraction blend mode, a difference blend mode, a darken only blend mode, and the like. Contrast enhancement can also be performed on the visual and thermal images to increase the quality of the displayed image.

In some embodiments, each pixel in the output of the visual camera and each pixel in the up-scaled output of the thermal detector is assigned a numerical value corresponding to an 8-bit color (i.e., a value between 0 and 255). The values for each pixel of the output from the visual camera and the values for each pixel of the up-scaled output of the thermal detector are then proportioned, combined, and normalized to generate an output image signal.

For example, each pixel in the output of the visual camera is weighted at a value of 0.4. Each pixel in the up-scaled output of the thermal detector is also weighted at a value of 0.4. A multiplication is performed on the pixel values from the output of the visual camera and the up-scaled pixel values of the output of the thermal detector. The product of the pixel values is normalized by dividing by 255. The result of the normalized multiplication is weighted at a value of 0.2.

For each pixel of the display, the output value is the mathematical sum of weighted values from the thermal camera, the thermal detector, and the normalized multiplication. An exemplary calculation is provided below in which the pixel value ("A") for the output of the visual camera is 200, and the pixel value ("B") for the up-scaled output of the thermal detector is 100. The result ("C") of the normalized multiplication is calculated below.

$$C = \frac{A \times B}{255} = \frac{200 \times 100}{255} = 78.43$$

The output pixel value ("D") of the corresponding pixel of the display is then calculated as provided below.

$$D=(0.4\times200)+(0.4\times100)+(0.2\times78.43)=135.69$$

The blend ratios of the pixel values for the output of the visual camera, the up-scaled output of the thermal detector, and the result of the multiplication can also be modified based on, among other things, features of the scene. For example, the blend ratios can be modified based on the amount of light present in the scene, the range of temperatures detected in the scene, the distance of objects in the scene to the thermal detection device, the ambient temperature of the scene, an average temperature of the scene, etc. Based on these features, the level of blend or the level of thermal overlay is modified. Additionally or alternatively, the level of blending of the images is manually controlled by the user. For example, a button is activated to toggle through various different blending ratios (e.g., 20% thermal, 40% thermal, 60% thermal, 80% thermal, etc.). In other embodiments, the user sets desired blend ratios.

In some embodiments, the output values, D, for each pixel are normalized. For example, if the highest output pixel value is 135.69, each of the output values for the pixels would be scaled by a factor of 255/135.69 to make at least one pixel correspond to an output pixel value of 255.

In other embodiments, different normalization techniques can be used. For example, only pixels corresponding to temperatures within, for example, a +/−5° or +/−10° window around the ambient temperature are displayed. An ambient temperature sensor is used to determine the ambient temperature of a scene being imaged or the ambient temperature of the environment around the thermal detection device 400. The output pixel values are then scaled such that all colors correspond to the window around the ambient temperature. Such an implementation prevents pixels from displaying extreme temperatures and washing out images. In some embodiments, the blending is only performed for portions of the scene within predefined temperature ranges (e.g., 40°-80°), or only the portions of a scene within a predefined or predetermined FOV of the thermal detector are blended. In other embodiments, a similar normalization procedure is performed, but an average temperature of a scene is determined (e.g., either an actual average temperature or an averaging of the pixel values for the output of the thermal detector). Although the display colors are generally displayed according to the visual color spectrum (i.e., from red to blue or violet), in some embodiments, the user is able to adjust or modify the colors at which certain temperatures or pixel values are displayed.

In some embodiments, the thermal image is blended or combined with a night vision system. For example, image intensification or light amplification is used to generate an image of a dim scene. The thermal radiation detected by the thermal detector is then blended or combined with the night vision image in a manner similar to that described above with respect to the visual image. In some embodiments, the thermal detection device 400 is configured to be switched between a blend or combined mode in which the thermal image is blended with the visual image and a mode in which the thermal image is blended with the night vision image.

The control module 435 is also configured to control a false-off mode that is used as a power conservation mode. For example, if no input devices (e.g., a button, a trigger, etc.) have been activated for at least a first threshold period of time (e.g., 5 minutes), the control module 435 turns off the display. While the display is turned off, the thermal detection device 400 remains powered in a standby mode. If the thermal detection device 400 remains in the standby mode for at least a second threshold period of time (e.g., 20 minutes), the thermal detection device 400 turns off. After the thermal detection device 400 turns off, the user activates a power button to turn the thermal detection device 400 back on. When in the standby mode, the thermal detection device 400 is able to be "woken up" using any of a variety of techniques. For example, the activation of a button can be used to wake up the thermal detection device 400, an accelerometer can be used to wake up the thermal detection device 400 (e.g., the thermal detection device 400 is being held in an upright position), or a change in the visual screen can be used to wake up the thermal detection device 400.

Software loaded on a computer is configured to work in conjunction with the thermal detection device 400. For example, the software is used to manage images, analyze images, and generate reports based on the images. The software also allows the user to select or modify folder structures to better manage captured images. In some embodiments, the software is used to modify the folder structure of the thermal detection device 400 to facilitate the review of images using the thermal detection device 400 and the analysis of the images using the computer. The software allows the user to annotate the captured images with, for example, observations or notes, the date the image was taken, the location where the image was taken (e.g., using GPS coordinates, customer name, temperature analysis, etc.). The software is also configured to apply or generate templates that organize images, the analysis of the images, conclusions related to the images, etc. into reports. The reports can be output as, for example, editable documents, PDFs, or the like.

Thus, the invention provides, among other things, a thermal detection device that includes a visual camera, a thermal detector, and a display. Various features and advantages of the invention are set forth in the following claims.

What is claimed is:

1. A thermal imaging device comprising:
a housing including a handle portion, wherein a removable and rechargeable battery pack is configured to be inserted into the handle portion for providing power to the thermal imaging device, wherein the battery pack includes a battery pack housing, at least one battery cell positioned within the battery pack housing, a terminal, and a latch mechanism, and, when the battery pack is coupled to the thermal imaging device, the latch mechanism engages the housing of the thermal imaging device to secure the battery back to the thermal imaging device such that a portion of the battery pack housing remains exposed;
a visual camera configured to generate a first signal related to a visual image;
an infrared sensor configured to generate a second signal related to a thermal image;
a display configured to display the visual image based on the first signal and the thermal image based on the second signal; and
a controller electrically connected to the visual camera, the infrared sensor, the display, and the inserted battery pack, the controller configured to receive the first signal, the second signal, a feedback control signal, and a calibration signal, the controller further configured to control the display based on the first signal, the second signal, the feedback control signal, and the calibration signal;
wherein the feedback control signal is related to at least one selected from the group consisting of an amount of light detected by the visual camera, an amount of thermal radiation detected by the infrared sensor, an ambient temperature, and an average ambient temperature;
wherein the calibration signal is related to one or more operational parameters, the operational parameters including at least one selected from the group consisting of the ambient temperature, a rate of change of the ambient temperature, and an operating temperature of the thermal imaging device; and
wherein the controller includes a memory configured to store the visual image and the thermal image, the memory further configured to store a set of temperature data associated with the thermal image, the set of temperature data being appended to the visual image, and the visual image, including the appended set of temperature data, and the thermal image being stored separately in the memory.

2. The thermal imaging device of claim 1, further comprising a light emitting diode ("LED") worklight.

3. The thermal imaging device of claim 1, wherein the battery pack has a lithium-based chemistry.

4. The thermal imaging device of claim 1, further comprising a user interface that includes a plurality of switches associated with controlling the thermal imaging device.

5. The thermal imaging device of claim 4, wherein the user interface includes a button for toggling between a visual image display mode and a thermal image display mode.

6. The thermal imaging device of claim 1, further comprising a memory configured to store the visual image and thermal image such that the visual image and the thermal image are associated with each other.

7. A method of operating a thermal imaging device, the method comprising:
inserting a removable and rechargeable battery pack into a handle portion of the thermal imaging device, the battery pack including a battery pack housing, at least one battery cell positioned within the battery pack housing, a terminal, and a latch mechanism, and, when the battery pack is inserted into the thermal imaging device, the latch mechanism engages the thermal imaging device to secure the battery pack to the thermal imaging device such that a portion of the battery pack housing remains exposed;
receiving a signal from a trigger portion related to capturing an image of a scene;
monitoring an ambient temperature associated with the thermal imaging device;
receiving a feedback control signal related at least one selected from the group consisting of an amount of light detected by the visual camera, an amount of thermal radiation detected by the infrared sensor, an ambient temperature, and an average ambient temperature;

receiving a calibration signal related to one or more operational parameters, the operational parameters including at least one selected from the group consisting of the ambient temperature, a rate of change of the ambient temperature, and an operating temperature of the thermal imaging device;

storing a visual image of the scene associated with a visual camera in a memory of the thermal imaging device;

storing a thermal image of the scene associated with an infrared sensor in the memory of the thermal imaging device;

storing a set of temperature data associated with the thermal image to the memory, the set of temperature data being appended to the visual image, and the visual image, including the appended set of temperature data, and the thermal image being stored separately in the memory;

selectively displaying one of the visual image and the thermal image on a display;

wherein the visual image and the thermal image are displayed at least partially based on the feedback control signal and the calibration signal.

8. The method of claim 7, further comprising determining a rate at which the ambient temperature of the thermal imaging device is changing.

9. The method of claim 8, further comprising compensating the infrared sensor based on the rate at which the ambient temperature of the thermal imaging device is changing.

10. The method of claim 7, further comprising supplying heat to the infrared sensor to substantially match a temperature of the infrared sensor to the ambient temperature of the thermal imaging device.

11. The method of claim 7, further comprising generating a feedback signal based on an output of the infrared sensor to control a setting of the visual camera.

12. A thermal imaging device comprising:
a visual camera configured to generate a first signal related to a visual image;
an infrared sensor configured to generate a second signal related to a thermal image;
a display configured to display the visual image based on the first signal and the thermal image based on the second signal;
a rechargeable lithium-based battery pack configured to be inserted into a handle portion of the thermal imaging device for providing power to the thermal imaging device, the battery pack including a battery pack housing, at least one battery cell positioned within the battery pack housing, a terminal, and a latch mechanism, and, when the battery pack is coupled to the thermal imaging device, the latch mechanism engages the thermal imaging device to secure the battery pack to the thermal imaging device such that a portion of the battery pack housing remains exposed; and
a controller electrically connected to the visual camera, the infrared sensor, the display, and the battery pack, the controller configured to control the display of the visual image and the thermal image on the display, the visual image based on the first signal and a feedback control signal, and the thermal image based on the second signal, the feedback control signal, and a calibration signal, the controller including a memory configured to store the visual image and the thermal image;
wherein the feedback control signal is related to at least one selected from the group consisting of an amount of light detected by the visual camera, an amount of thermal radiation detected by the infrared sensor, an ambient temperature, and an average ambient temperature;
wherein the calibration signal is related to one or more operational parameters, the operational parameters including at least one selected from the group consisting of the ambient temperature, a rate of change of the ambient temperature, and an operating temperature of the thermal imaging device; and
wherein the memory is further configured to store a set of temperature data associated with the thermal image, the set of temperature data being appended to the visual image, and the visual image, including the appended set of temperature data, and the thermal image being stored separately in the memory.

13. The thermal imaging device of claim 12, further comprising a user interface that includes a plurality of switches associated with controlling the thermal imaging device.

14. The thermal imaging device of claim 13, wherein the user interface includes a button for toggling between a visual image display mode and a thermal image display mode.

15. The thermal imaging device of claim 12, further comprising a memory configured to store the visual image and thermal image such that the visual image and the thermal image are associated with each other.

* * * * *